United States Patent
Kawai et al.

(10) Patent No.: US 9,392,161 B2
(45) Date of Patent: Jul. 12, 2016

(54) IMAGING APPARATUS

(71) Applicants: OLYMPUS CORPORATION, Shibuya-ku, Tokyo (JP); OLYMPUS IMAGING CORP., Shibuya-ku, Tokyo (JP)

(72) Inventors: Sumio Kawai, Hachioji (JP); Toshio Takahashi, Hachioji (JP); Kunio Yamamiya, Sagamihara (JP)

(73) Assignee: OLYMPUS CORPORATION (JP)

( * ) Notice: Subject to any disclaimer, the term of this patent is extended or adjusted under 35 U.S.C. 154(b) by 16 days.

(21) Appl. No.: 14/336,566

(22) Filed: Jul. 21, 2014

(65) Prior Publication Data
US 2015/0029387 A1 Jan. 29, 2015

(30) Foreign Application Priority Data

Jul. 23, 2013 (JP) ................................. 2013-153050

(51) Int. Cl.
| | |
|---|---|
| H04N 5/232 | (2006.01) |
| H04N 5/225 | (2006.01) |
| G03B 5/02 | (2006.01) |
| G03B 3/10 | (2006.01) |
| G02B 7/28 | (2006.01) |
| G02B 7/04 | (2006.01) |
| G03B 13/36 | (2006.01) |

(52) U.S. Cl.
CPC ......... *H04N 5/23212* (2013.01); *H04N 5/2254* (2013.01); *H04N 5/23296* (2013.01); *G02B 7/04* (2013.01); *G02B 7/282* (2013.01); *G03B 3/10* (2013.01); *G03B 5/02* (2013.01); *G03B 13/36* (2013.01)

(58) Field of Classification Search
None
See application file for complete search history.

(56) References Cited

U.S. PATENT DOCUMENTS

| | | | | | |
|---|---|---|---|---|---|
| 4,737,813 | A | * | 4/1988 | Ishida ....................... | G02B 7/34 396/106 |
| 5,589,723 | A | * | 12/1996 | Yoshida ................... | G02B 7/08 310/323.02 |
| 2008/0002960 | A1 | * | 1/2008 | Ito ....................... | H04N 5/23212 396/125 |
| 2013/0107105 | A1 | * | 5/2013 | Ishikawa ............ | H04N 5/23212 348/345 |
| 2014/0022636 | A1 | * | 1/2014 | Asano .................... | G02B 27/22 359/463 |

FOREIGN PATENT DOCUMENTS

JP 2006--078734 3/2006

* cited by examiner

*Primary Examiner* — Roberto Velez
*Assistant Examiner* — Quan Pham
(74) *Attorney, Agent, or Firm* — Volpe and Koenig, P.C.

(57) ABSTRACT

An imaging apparatus includes: an imaging optical system having a variable power lens and a focus lens; an imaging element that generates image data via the imaging optical system; a movable frame that holds the focus lens and is movable along an optical axis of the imaging optical system; a first driving unit that causes the movable frame to move toward an in-focus position along the optical axis direction; a focus sensitivity determination unit that, based on a zoom position of the variable power lens, determines whether a focus sensitivity indicating a ratio of a change amount of the in-focus position to a movement amount of the focus lens is equal to or smaller than a specified value; and a driving controller that drives the first driving unit to move the movable frame to the in-focus position if the focus sensitivity is larger than the specified value.

6 Claims, 15 Drawing Sheets

| | FC SENSITIVITY | EXTENSION AMOUNT TO EXTREME CLOSE-UP |
|---|---|---|
| | FOURTH LENS GROUP | FOURTH LENS GROUP |
| Wide | 2.623 | 0.055 |
| WS | 2.58 | 0.063 |
| Std | 2.405 | 0.099 |
| ST | 2.016 | 0.2 |
| Tele | 1.226 | 0.539 |

IMAGING APPARATUS

CROSS-REFERENCE TO RELATED APPLICATIONS

This application is based upon and claims the benefit of priority from Japanese Patent Application No. 2013-153050, filed on Jul. 23, 2013, the entire contents of which are incorporated herein by reference.

BACKGROUND

1. Technical Field

The disclosure relates to an imaging apparatus that images a subject and generates image data of the subject.

2. Related Art

In recent years, in autofocus processing (hereinafter, referred to as "AF processing") performed by imaging apparatuses such as digital cameras, a technique is known, in which, after a focus is roughly adjusted by moving a movable frame holding a focus lens to near an in-focus position along an optical axis of the focus lens by a stepping motor, the focus is finely adjusted by moving a holding frame holding an imaging element to the in-focus position along the optical axis of the focus lens by a piezoelectric element (for example, Japanese Laid-open Patent Publication No. 2006-78734).

SUMMARY

In some embodiments, an imaging apparatus includes: an imaging optical system that has a variable power lens capable of changing a focal distance by moving along an optical axis direction, has a focus lens capable of adjusting a focal point by moving along the optical axis direction, and forms a subject image by the variable power lens and the focus lens; an imaging element that generates image data via the imaging optical system; a movable frame that holds the focus lens and is movable back and forth along an optical axis of the imaging optical system; a first driving unit that causes the movable frame to move by a specified distance toward an in-focus position along the optical axis direction to adjust the focal point of the imaging optical system; a zoom position detection unit that detects a zoom position of the variable power lens on the optical axis; a focus sensitivity determination unit that, based on the zoom position detected by the zoom position detection unit, determines whether a focus sensitivity indicating a ratio of a change amount of the in-focus position to a movement amount of the focus lens is equal to or smaller than a specified value; and a driving controller that drives the first driving unit to move the movable frame to the in-focus position if the focus sensitivity determination unit determines that the focus sensitivity is larger than the specified value.

The above and other features, advantages and technical and industrial significance of this invention will be better understood by reading the following detailed description of presently preferred embodiments of the invention, when considered in connection with the accompanying drawings.

DETAILED DESCRIPTION

Figure 1:
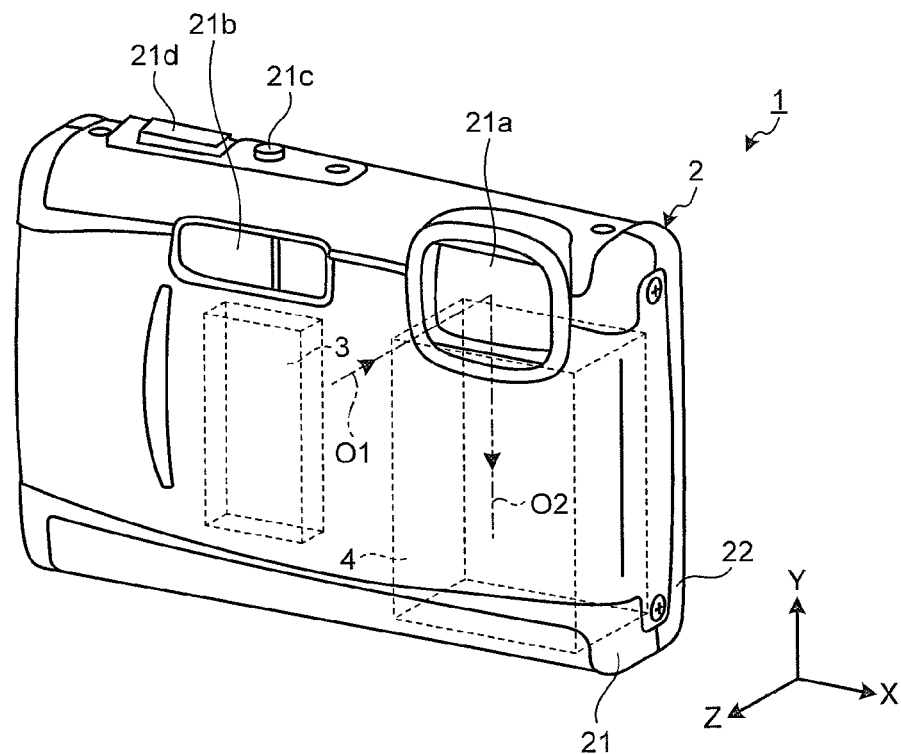
FIG. 1 is a perspective view of an external appearance of an imaging apparatus according to a first embodiment, viewed from a front side.

Hereinafter, modes for carrying out the invention (hereinafter, referred to as "embodiments") will be described with reference to the drawings. The present invention is not limited by the embodiments below. Further, in the drawings, illustration is made by appending the same reference signs to the same portions. Furthermore, it is necessary to note that the drawings are schematic, and a relation between a thickness and a width of each component, ratios among the respective components, and the like are different from the actual. Moreover, a portion is included, which has different dimensional relations and ratios among the drawings.

First Embodiment

Figure 2:
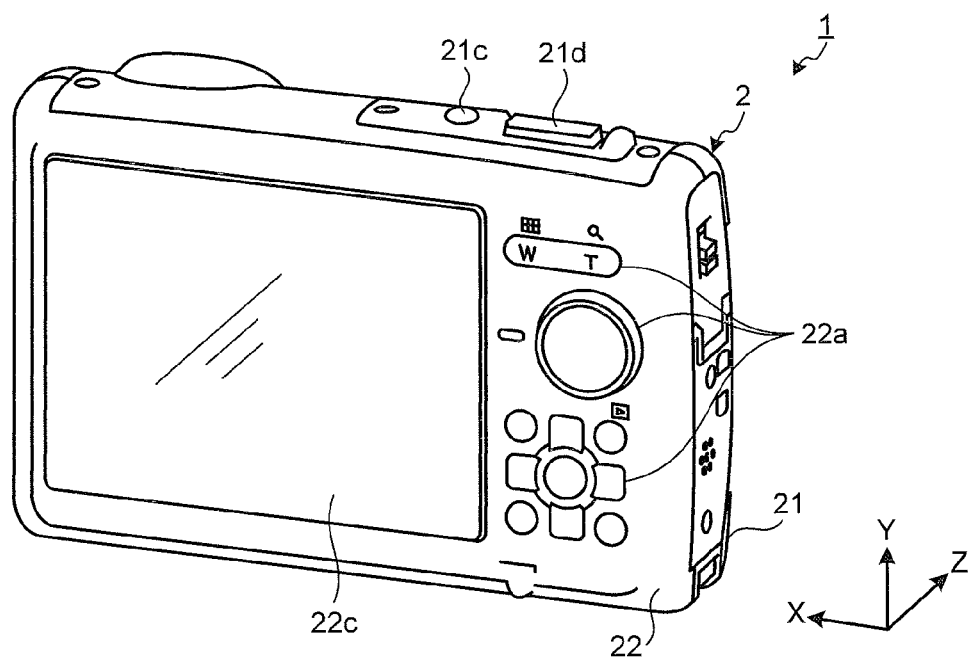
FIG. 2 is a perspective view of the external appearance of the imaging apparatus according to the first embodiment, viewed from a rear side.

FIG. 1 is a perspective view of an external appearance of an imaging apparatus according to a first embodiment, viewed from a front side. FIG. 2 is a perspective view of the external appearance of the imaging apparatus according to the first embodiment, when viewed from a rear side. In the explanation below, as a coordinate system specific to an imaging apparatus 1, a width direction of the imaging apparatus 1 serves as an X axis, a vertical direction of the imaging apparatus 1 serves as an Y axis, and a thickness direction of the imaging apparatus 1 serves as a Z axis.

As illustrated in FIG. 1 and FIG. 2, the imaging apparatus 1 includes a casing 2 having an approximately cuboid box shape, a camera control substrate 3 that is housed in the casing 2 and that controls each unit of the imaging apparatus 1, and an imaging optical system unit 4 that generates image data of subjects via a folded optical system which is for imaging subjects.

The casing 2 includes a front cover member 21 formed to cover a front surface, both side surfaces, a top surface, and a bottom surface, and a rear cover member 22 formed to cover a rear side. The casing 2, by joining the front cover member 21 and the rear cover member 22 in a mutually opposing state, forms an approximately cuboid box shape with an internal space.

On the front surface of the front cover member 21, a shooting window member 21a, which is for causing a subject light flux to be incident on the built-in imaging optical system unit 4 in the casing 2, and a light emission window 21b of a strobe light emitting device (not illustrated) are provided. On the top surface of the front cover member 21, a power switch 21c, which switches between an ON state and an OFF state of a power supply of the imaging apparatus 1, and a release switch 21d, which is for instructing the imaging apparatus 1 to do imaging operations, are provided.

On the back surface of the rear cover member 22, an operating switch group 22a, which is for setting a shooting mode, an operation menu, and the like, a display unit 22c, which is configured of a display panel or the like formed of a liquid crystal or organic EL (Electro Luminescence) and which displays images, and the like are provided.

The camera control substrate 3 comprehensively controls operations of the imaging apparatus 1 by performing transfer or the like of instructions and data corresponding to respective units included in the imaging apparatus 1. The camera control substrate 3 is configured by mounting a central processing unit (CPU), a strobe light emission controller that controls a strobe device, an image processing unit (image processing engine) that performs image processing on image data, a recording controller that writes image data onto a recording medium such as a memory card, a hand-shake detection sensor, and the like on a printed substrate. The camera control substrate 3 is housed inside the front cover member 21.

The imaging optical system unit 4, as a folded optical system for imaging a subject, includes an imaging optical system and an imaging unit, which receives light condensed by the folded optical system and generates image data of the subject.

Figure 3:
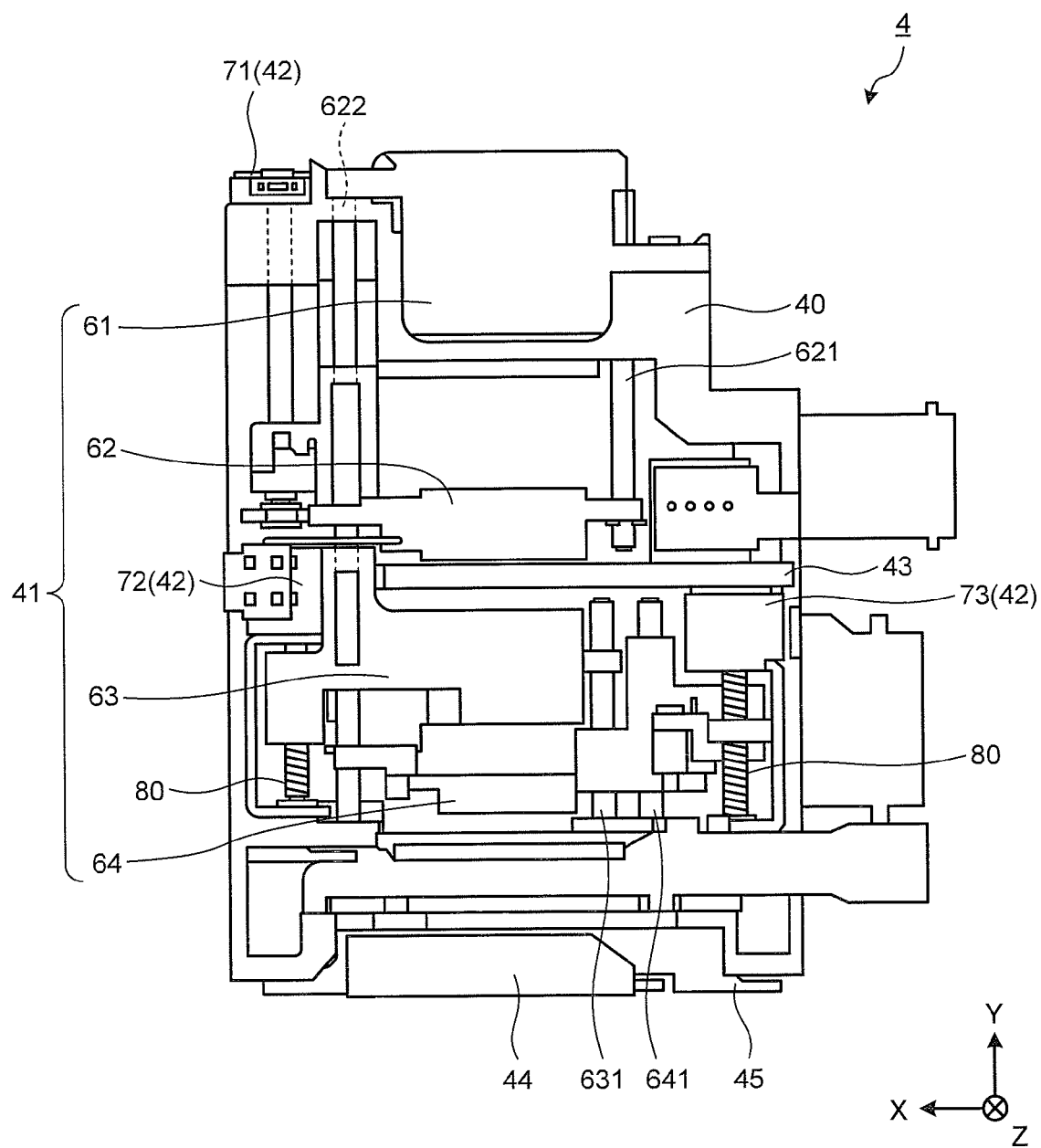
FIG. 3 is an enlarged plan view of main parts of an imaging optical system unit of the imaging apparatus according to the first embodiment.
Figure 4:
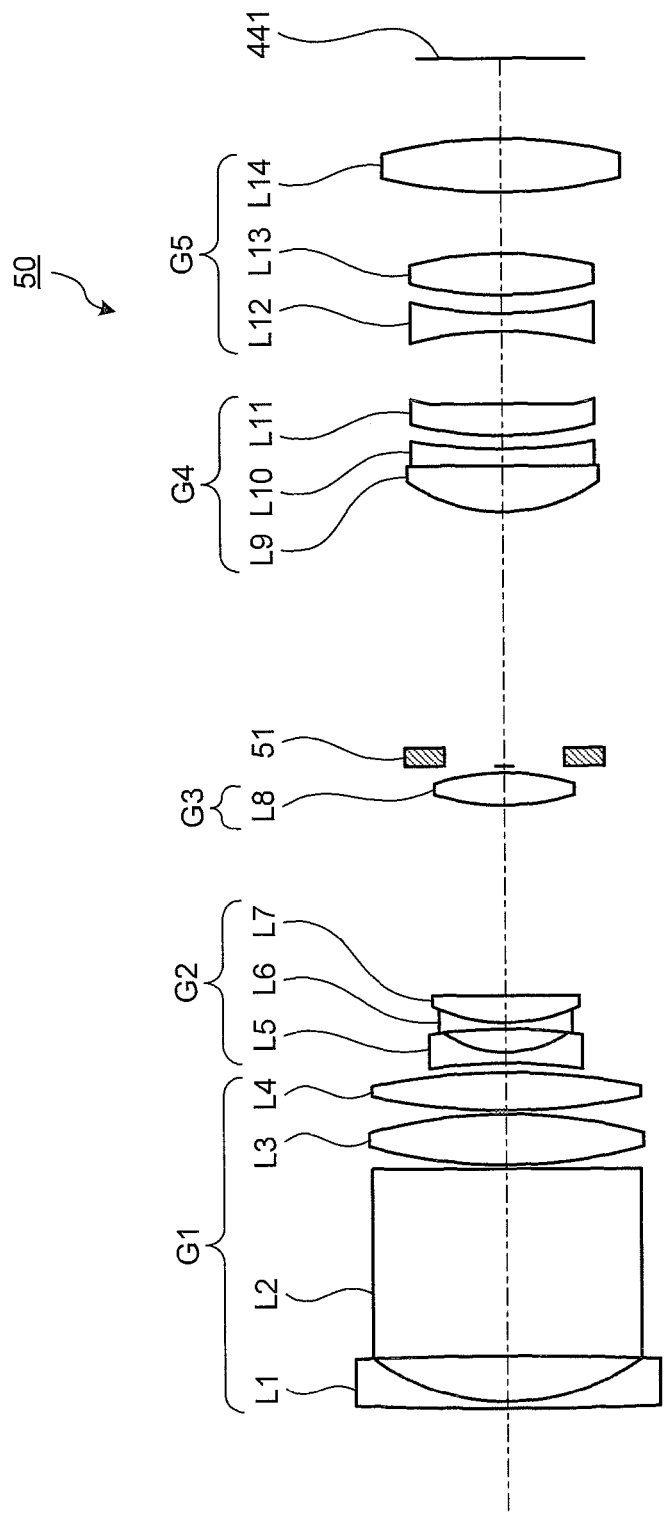
FIG. 4 is a schematic diagram illustrating a configuration of an imaging optical system of the imaging optical system unit of the imaging apparatus according to the first embodiment.

A structure of the imaging optical system unit 4 will be described. FIG. 3 is an enlarged plan view of main parts of the imaging optical system unit 4. FIG. 4 is a schematic diagram illustrating a configuration of the imaging optical system of the imaging optical system unit 4.

As illustrated in FIG. 3, the imaging optical system unit 4 includes a main body frame 40 forming an outer envelope, the imaging optical system that condenses light from a specified field area and forms a subject image, a lens holding frame group 41 configured of a plurality of lens holding frames for respectively holding a plurality of lens groups included in the imaging optical system, a lens driving device 42 that drives the holding frames, a shutter unit 43 including a shutter mechanism and a shutter driving unit, an imaging unit 44 including an electrical substrate or the like on which an imaging element that performs photoelectric conversion on a subject image formed by a lens unit and other electrical components are mounted, and a hand-shake prevention unit 45 that moves at least a part of the imaging optical system in a direction along a light receiving surface of the imaging element.

An imaging optical system 50, as illustrated in FIG. 4, includes, in sequence from an object side, a first lens group G1 (first positive lens group) with positive refractive power, a second lens group G2 (first negative lens group) with negative refractive power, a third lens group G3 with positive refractive power, a fourth lens group G4 (second positive lens group) with positive refractive power, and a fifth lens group G5 (third positive lens group) with positive refractive power. A diaphragm 51 is arranged between the third lens group G3 and the fourth lens group G4.

The first lens group G1 includes a negative meniscus lens L1 with a convex surface facing the object side, a prism L2, a biconvex positive lens L3, and a biconvex lens L4. The second lens group G2 includes a biconcave negative lens L5, a biconcave negative lens L6, and a biconvex positive lens L7. The third lens group G3 includes a biconvex positive lens L8. The fourth lens group G4 includes a biconvex positive lens L9, a biconcave negative lens L10, and the biconvex positive lens L11. The biconvex positive lens L9 and the biconcave negative lens L10 are cemented together. The fifth lens group G5 includes a biconcave negative lens L12, a biconvex positive lens L13, and a biconvex positive lens L14. The imaging optical system 50 configured as above is a folded optical system that folds a light flux from a subject, which is incident from the shooting window member 21a along an optical axis O1, in a direction of an optical axis O2 perpendicular to the optical axis O1 by the prism L2 to guide the light flux to a light receiving surface of an imaging element 441 of the imaging unit 44, and forms an optical subject image on the light receiving surface of the imaging element 441. Further, in the first embodiment, the fourth lens group G4 functions as a focus lens that adjusts a focal point of the imaging optical system 50, and the second lens group G2 and the third lens group G3 function as variable power lenses that is able to change a focal distance of the imaging optical system 50.

The lens holding frame group 41 includes a first group holding frame 61 that holds the first lens group G1, a second group holding frame 62 that holds the second lens group G2, a third group holding frame 63 that holds the third lens group G3, a fourth group holding frame 64 that holds the fourth lens group G4, and a fifth group holding frame (not shown in FIG. 3) that holds the fifth lens group G5. Of the first group holding frame 61 to the fifth group holding frame, the second group holding frame 62, the third group holding frame 63, and the fourth group holding frame 64 are movable in a direction along the optical axis O2.

The second group holding frame 62 is movably supported in a direction along the optical axis O2 by two shafts of a second group suspension shaft 621 and a suspension shaft 622 that are pivotally supported at specified regions with respect to the main body frame 40. The third group holding frame 63 is movably supported in the direction along the optical axis O2 by two shafts of a third group suspension shaft 631 and the suspension shaft 622 that are pivotally supported at specified regions with respect to the main body frame 40. The fourth group holding frame 64 is movably supported in the direction along the optical axis O2 by two shafts of a fourth group suspension shaft 641 and the suspension shaft 622 that are pivotally supported at specified regions with respect to the main body frame 40. The second group suspension shaft 621 and the third group suspension shaft 631 also function as detents for the second group holding frame 62 and the third group holding frame 63, respectively. The second group holding frame 62 and the third group holding frame 63, when the imaging apparatus 1 performs a zoom operation, move along the optical axis O2 independently of each other. Further, the fourth group holding frame 64, when the imaging apparatus 1 performs a focusing operation, moves toward an in-focus position along the optical axis O2.

Between the second group holding frame 62 and the third group holding frame 63, the shutter unit 43 is arranged with respect to the main body frame 40. Further, on a front surface of the imaging unit 44 on a bottom surface side relative to the fourth group holding frame 64, the hand-shake prevention unit 45 is arranged. On the hand-shake prevention unit 45, the fifth lens group G5 forming a part of the imaging optical system 50 is arranged. The imaging unit 44 is arranged such that a portion on the bottommost surface side of the imaging optical system unit 4 is fixed to the main body frame 40.

The lens driving device 42 is configured by using at least a second driving unit 71, a third driving unit 72, and a fourth driving unit 73, which are driving sources, a lead screw 80 connected to rotating shafts of the respective driving units, and a nut member screwed on the lead screw 80. Each of the second driving unit 71, the third driving unit 72, and the fourth driving unit 73 is configured by using a stepping motor and a driving driver. The fourth driving unit 73 functions as a second driving unit according to the present embodiment.

Figure 5:
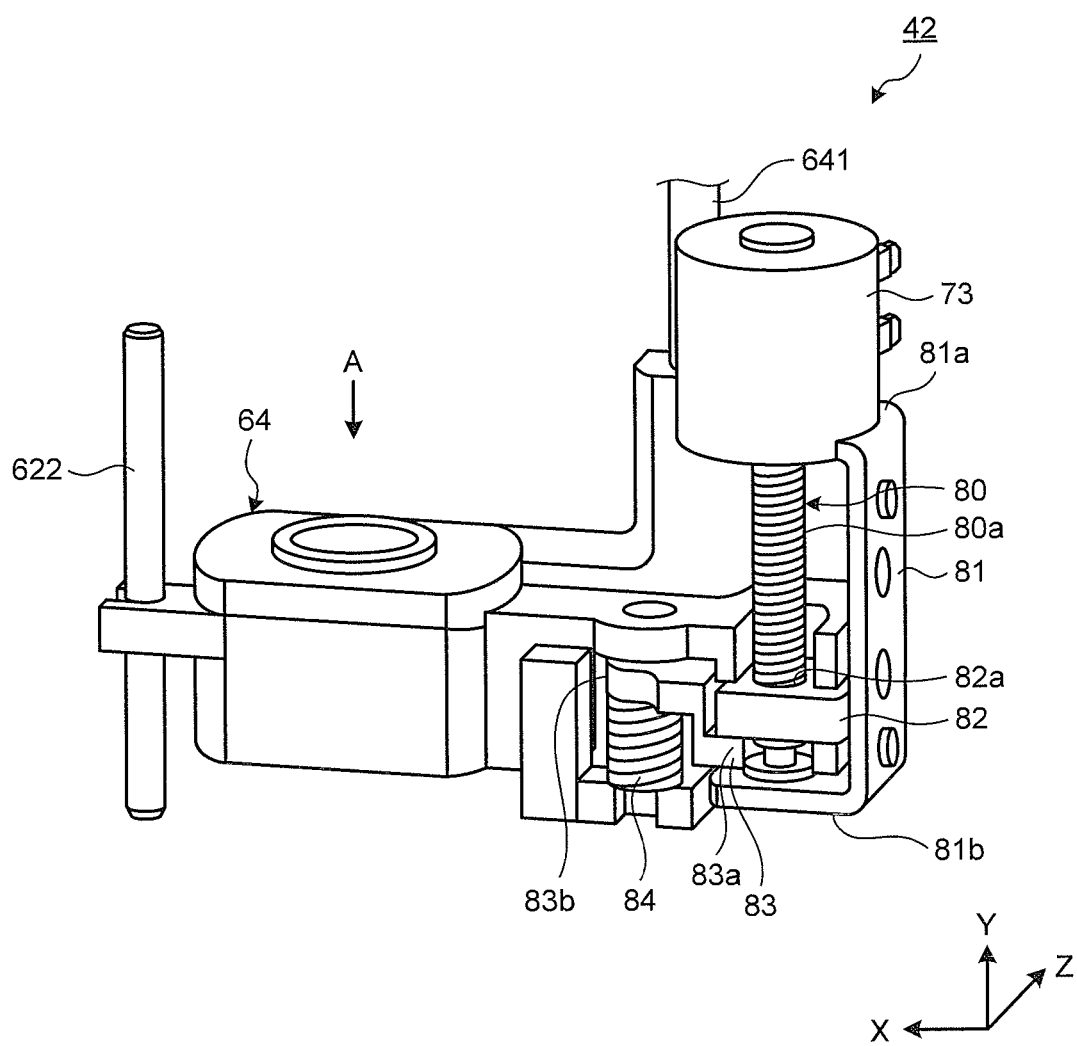
FIG. 5 is an enlarged perspective view of main parts of a fourth group holding frame and a fourth driving unit of a lens driving device, which are extracted from the imaging optical system unit of the imaging apparatus according to the first embodiment.

Of the second group holding frame 62, the third group holding frame 63, and the fourth group holding frame 64, a configuration of the fourth group holding frame 64 and a configuration of the lens driving device 42 including the fourth driving unit 73 for driving the fourth group holding frame 64 back and forth in the direction of the optical axis O2 will be described in detail below. FIG. 5 is an enlarged perspective view of main parts of the fourth group holding frame 64 and the fourth driving unit 73 of the lens driving device 42, which are extracted from the imaging optical system unit 4.

First, the configuration of the lens driving device 42 including the fourth driving unit 73 will be described. As illustrated in FIG. 5, the lens driving device 42 includes at least the fourth driving unit 73, the lead screw 80 that transmits a rotational force of the fourth driving unit 73, a support unit 81 that pivotally supports both ends of the lead screw 80, a nut member 82 screwed on the lead screw 80, a nut preventing member 83 that prevents backlash between the nut member 82 and the lead screw 80, and a biasing member 84 that biases the nut member 82 by pressing it toward the direction along the optical axis O2 via the nut preventing member 83.

The fourth driving unit 73 moves the fourth group holding frame 64, which contributes to focusing, in the direction along the optical axis O2. The fourth driving unit 73 is arranged at a specified position inside the main body frame 40. The fourth driving unit 73 is configured by using a forward-reverse rotatable stepping motor and a driving driver. In the first embodiment, the fourth driving unit 73 functions as a first driving unit that sequentially moves the fourth group holding frame 64 by a specified distance toward an in-focus position along the optical axis O2 to roughly adjust a focal point of the imaging optical system 50. Specifically, the fourth driving unit 73, by microstep operations, sequentially moves the fourth group holding frame 64 by a specified distance along the optical axis O2 and adjusts the focal point of the imaging optical system 50.

The lead screw 80 functions as a rotating shaft of the fourth driving unit 73, and threads are formed on the entire outer periphery of a bar-shaped member 80a. Both ends of the lead screw 80 are pivotally supported by the support unit 81. Further, the lead screw 80 is provided inside the main body frame 40 so as to be parallel to the direction along the optical axis O2.

The support unit 81 is formed by a folding process on a plate member such that a cross section has a C-shape (channel form). A one-end arm part 81a of the support unit 81 is connected to one end surface of the fourth driving unit 73 and pivotally supports a proximal end portion of the lead screw 80. The other-end arm part 81b of the support unit 81 pivotally supports a distal end portion of the lead screw 80.

The nut member 82 has a flat cuboidal shape, and in an approximately central part, is provided with a penetrating screw hole 82a screwed on the lead screw 80. On one surface (top side) of the nut member 82, a convex part (not illustrated) protruding in the same direction as the optical axis O2 is provided, and the convex part is fitted into with a concave part (not illustrated) provided on the fourth group holding frame 64. Therefore, the nut member 82 is arranged so as to be substantially integrated with the fourth group holding frame 64 in a state in which rotation relative to the fourth group holding frame 64 is restricted. To the other surface of the nut member 82, a part of the nut preventing member 83 is contacted.

The nut preventing member 83 is formed of a one arm unit 83a having a nut contact surface in contact with the other surface of the nut member 82 and an other arm unit 83b formed in a different level from the one arm unit 83a in the direction along the optical axis O2.

The biasing member 84 biases the nut preventing member 83 upward in a vertical direction. The biasing member 84 is configured by using a compression torsion spring. One end of the biasing member 84 is connected to the nut preventing member 83, and the other end is connected to the support unit 81.

Figure 6:
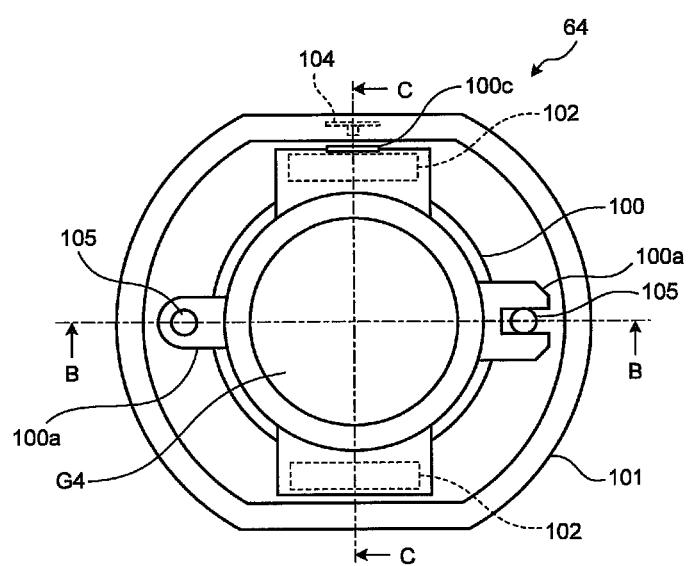
FIG. 6 is a plan view of the fourth group holding frame viewed in a direction of an arrow A in FIG. 5.
Figure 7A:
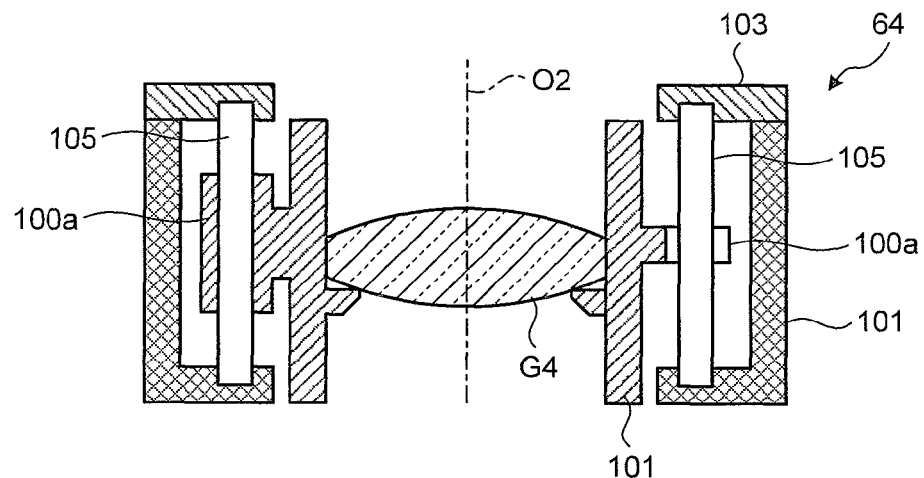
FIG. 7A is a B-B line cross section in FIG. 6.
Figure 7B:
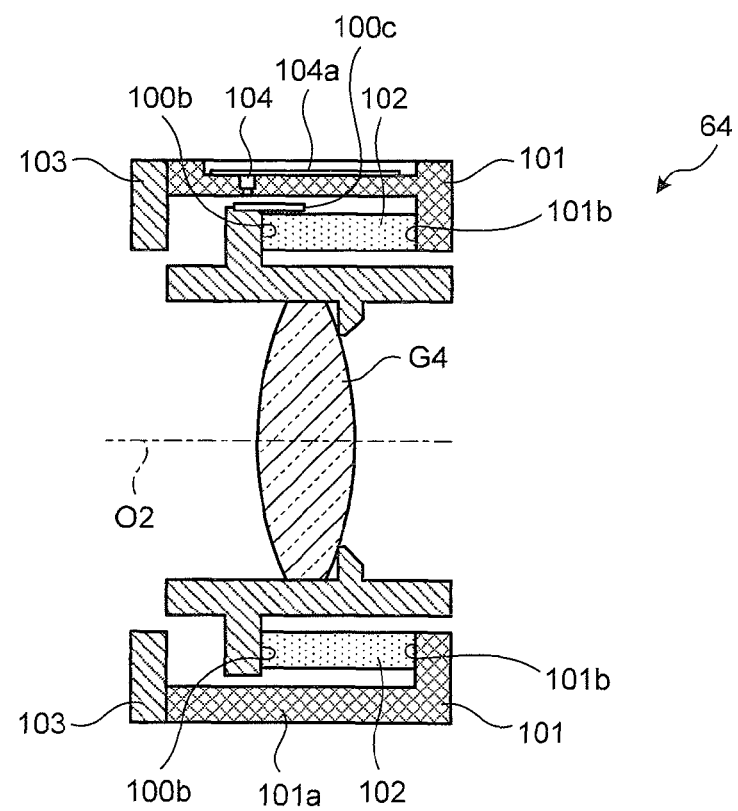
FIG. 7B is a C-C line cross section in FIG. 6.

Next, the configuration of the fourth group holding frame 64 will be described. FIG. 6 is a plan view of the fourth group holding frame 64 viewed in a direction of an arrow A in FIG. 5, and is a plan view in which a pressing ring 103 is removed. FIG. 7A is a B-B line cross section in FIG. 6. FIG. 7B is a C-C line cross section in FIG. 6. In FIG. 7A and FIG. 7B, to simplify the illustrations, the fourth lens group G4 is expressed by a single lens.

As illustrated in FIG. 6, FIG. 7A, and FIG. 7B, the fourth group holding frame 64 includes a movable frame 100 that holds the fourth lens group G4, a holding frame 101 that movably holds the movable frame 100 along the direction of the optical axis O2, piezoelectric elements 102 that function as the first driving unit, the pressing ring 103, a position sensor 104 (hereinafter, referred to as the "focus position detector 104"), and guide shafts 105.

The movable frame 100 has an approximately tubular shape and holds the fourth lens group G4 inside thereof. The movable frame 100 is supported by the holding frame 101 by fitting of bearings 100a, which are provided on an outer circumferential side symmetrically with respect to the optical axis O2 and formed of a hole and a notch, into the two guide shafts 105, respectively. The movable frame 100 is able to move back and forth along the optical axis O2 via the two guide shafts 105. The movable frame 100 includes receiving parts 100b which are provided on the outer circumferential side in the vertical direction with respect to the optical axis O2 and to which one ends of the piezoelectric elements 102 are fixed with adhesive agent or the like. Furthermore, the movable frame 100 is provided with a scale 100c (N-S polarities are magnetized in the direction perpendicular to the optical axis O2) which is formed of a magnet and provided on an upper side of the outer circumferential side. On a lower side of the movable frame 100, a counterbalance using a metal member such as brass may be provided on the upper side of the outer circumferential side such that the center of gravity of the movable frame 100 coincides with the optical axis O2.

The holding frame 101 has a double D-shape, which is a tubular shape whose upper and lower ends are cut. The holding frame 101 includes a torso part 101a, which has an approximately cylindrical shape, and a bottom part 101b, which has an approximately circular ring shape and to which one ends of the piezoelectric elements 102 are fixed with adhesive agent or the like. The torso part 101a and the bottom part 101b are integrally formed. Further, on an upper surface of the holding frame 101, the pressing ring 103 is fixed. Furthermore, on an inner circumferential side of the holding frame 101, the focus position detector 104 formed of a hall element is provided in a position opposite to the scale 100c provided on the movable frame 100. The focus position detector 104 is electrically connected to a flexible member 104a formed of a flexible printed board.

The piezoelectric elements 102, which are voltage displacement actuators, are a plurality of the piezoelectric elements 102 (for example, two arranged in a bisected manner in the circumferential direction, or three), which are rectangular and formed of laminated piezoelectric elements having structures in which a plurality of piezoelectric layers are laminated in the direction of the optical axis O2. The piezoelectric elements 102 have distal end surfaces and proximal end surfaces opposing to each other in an extension/contraction direction. In one end of the holding frame 101, the proximal end surfaces of the piezoelectric elements 102 are joined to the bottom part 101b, which extends to the inner circumferential side to form a flange, with adhesive agent or the like, and the distal end surfaces are joined to the receiving parts 100b of the movable frame 100 with adhesive agent or the like.

As a modified example, the voltage displacement actuator may be configured by using any of a polylactide laminate film that extends and contracts in a direction along a film plane perpendicular to a voltage application direction when a voltage is applied, an ion-conducting actuator that is bent and displaced in the voltage application direction, and a conductive polymer actuator that extends and contracts in a direction perpendicular to the voltage application direction.

Further, the piezoelectric elements 102 have cuboid shapes. The piezoelectric elements 102 extend to a subject side (in the vertical direction in FIG. 7A) when a voltage is applied, and are displaced to approximately initial states when a voltage is not applied. Furthermore, contraction occurs when a voltage is applied in the opposite direction. In the first embodiment, the piezoelectric elements 102 function as the first driving unit that moves the movable frame 100 by a small step to an in-focus position along the optical axis O2 to adjust the focal point of the imaging optical system 50. In the first embodiment, the movable frame 100 is guided by the guide shafts 105; however, if the stiffness of the piezoelectric elements 102 in the direction perpendicular to the optical axis O2 is high enough, guide for the movable frame 100 by the guide shafts 105 may not be needed.

The pressing ring 103 has a circular ring shape and is positioned at an end of the holding frame 101 to be joined to the holding frame 101 with a fastening means such as a screw or bond. Further, the pressing ring 103 includes holes or concave portions formed thereon, which are fitted into one ends of the guide shafts 105 for positioning of the guide shafts 105 with respect to the holding frame 101. By fitting of the other ends of the guide shafts 105 into the holes or the concave portions formed on the holding frame 101, the position of the guide shafts 105 with respect to the holding frame 101 is determined.

The focus position detector 104, when the movable frame 100 moves along the direction of the optical axis O2, detects a position of the scale 100c provided on the movable frame 100 to thereby detect a position of the movable frame 100 with respect to the holding frame 101 on the optical axis O2. Open control is performed on the holding frame 101 by the fourth driving unit 73 that is a stepping motor functioning as the second driving unit, and a position of the holding frame 101 on the optical axis O2 is determined from the number of operation steps from a reference position. Here, for detection of the reference position of the holding frame 101, an optical position detector (not illustrated) is used. Therefore, the focus position detector 104 is able to detect a position of the fourth group holding frame 64 from the imaging plane on the optical axis O2.

More specifically, the focus position detector 104 is a hall element, the scale 100c is a magnet magnetized in the direction perpendicular to the optical axis O2, and absolute positions are detectable. Further, the focus position detector 104 is able to detect displacement of the piezoelectric elements 102 on a one-to-one basis by being arranged near the piezoelectric elements 102, and is able to accurately control the piezoelectric elements 102. If the focus position detector 104 is arranged at a position distant from the piezoelectric elements 102, positions are detected with errors due to an inclination of the movable frame 100 or the like, so that precise control is impossible. Furthermore, in the first embodiment, the focus position detector 104 is configured by using a hall element; however, other magnetic detection elements such as giant magneto-resistive elements are applicable, or others based on optical detection methods or capacitance detection methods may be used. Of course, if a different detection method is used, it goes without saying that the scale 100c corresponding to the method is used. Moreover, if position control on the holding frame 101 is performed not by a stepping motor but by any of a DC motor, a voice coil motor, an ultrasonic motor, and an electrostatic motor, the position control on the holding frame 101 is possible by using such a position sensor as used to detect a position of the movable frame 100.

When the lens driving device 42 configured as above is driven, the fourth driving unit 73 (motor) drives to thereby cause the lead screw 80 to rotate, and the nut member 82 moves back and forth by rotation of the lead screw 80. The nut member 82 moves the fourth group holding frame 64 in the direction of the optical axis O2 via the nut preventing member 83 and causes high-speed movement such that an in-focus position falls within a specified range $\Delta F$ on an image plane side. In this case, to move a focus position by $\Delta F$, it is necessary to move the fourth group holding frame 64 by $\Delta F/(FC$ sensitivity$)=Z$, and a movement amount of the fourth group holding frame 64 with a minimum driving amount Mmin by the fourth driving unit 73 is set to be $\Delta Z2$ that is smaller than Z. Thereafter, by driving of the piezoelectric elements 102, the movable frame 100 sequentially moves by a step of a movement amount $\Delta Z1$ that is sufficiently smaller than $\Delta Z2$ in the direction of the optical axis O2 along the guide shafts 105, so the movable frame 100 is controlled toward the in-focus position. Therefore, it is possible to perform focusing of the imaging apparatus 1 at high speed and with high accuracy. In this case, it is preferable to set a maximum displacement amount Z1max of the movable frame 100 by the piezoelectric elements 102 to be equal to or greater than twice of the minimum movement amount $\Delta Z2$ of the movable frame 100 by the fourth driving unit 73.

Figure 8:
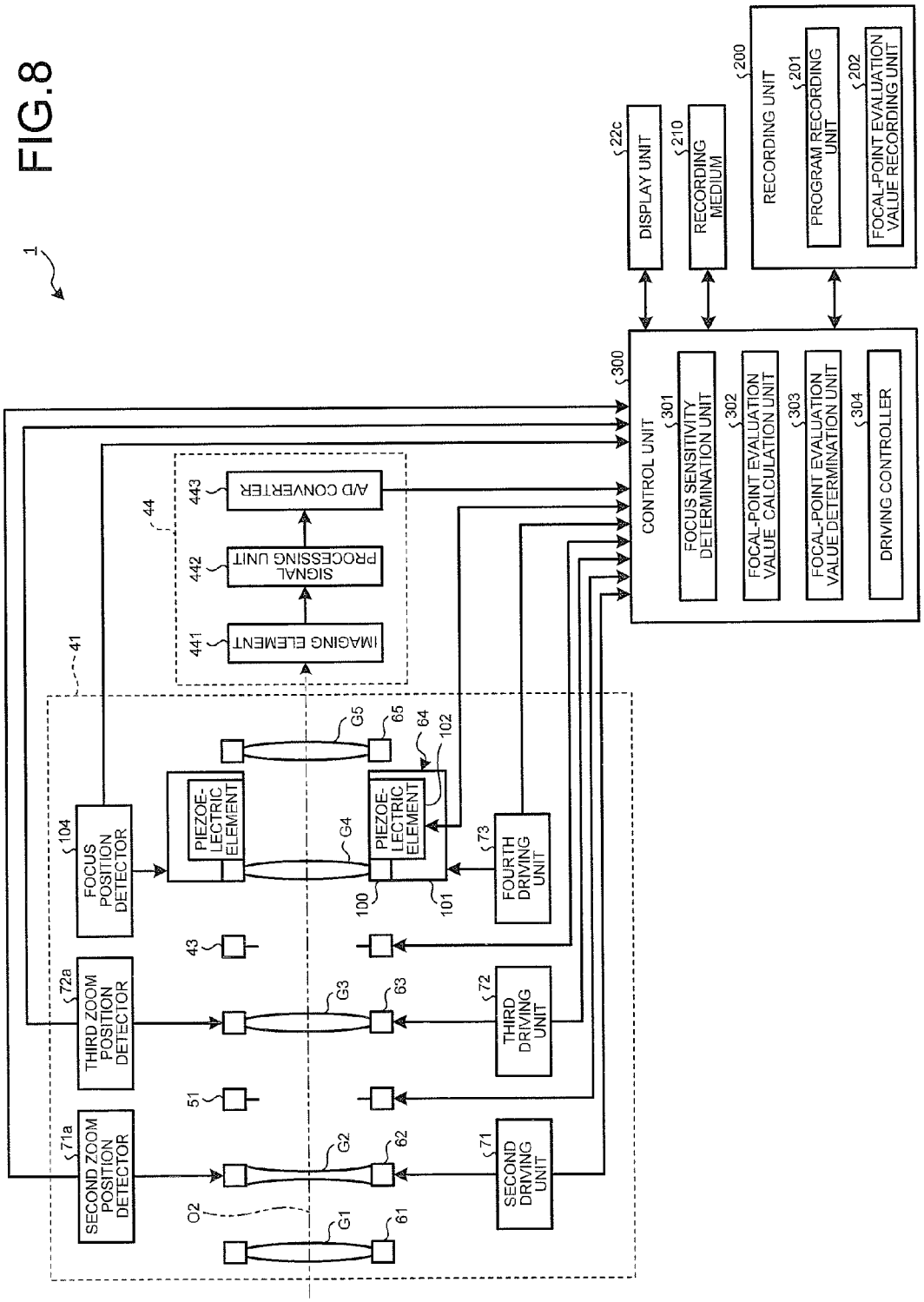
FIG. 8 is a block diagram schematically illustrating a functional configuration of the imaging apparatus according to the first embodiment.

Next, a functional configuration of the above described imaging apparatus 1 will be described. FIG. 8 is a block diagram schematically illustrating the functional configuration of the imaging apparatus 1. In FIG. 8, only main parts of the imaging apparatus according to the first embodiment will be described. Further, in FIG. 8, to simplify the illustrations, configurations of the first lens group G1 to the fifth lens group G5 are expressed by a single lens. Furthermore, in FIG. 8, the same reference signs are appended to the above described configurations and explanations will be omitted.

As illustrated in FIG. 8, the imaging apparatus 1 includes the display unit 22c, the lens holding frame group 41, the imaging unit 44, a recording unit 200, a recording medium 210, and a control unit 300.

The lens holding frame group 41 includes the first lens group G1, the second lens group G2, the third lens group G3, the fourth lens group G4, the fifth lens group G5, the first group holding frame 61, the second group holding frame 62, the third group holding frame 63, the fourth group holding frame 64, a fifth group holding frame 65, the second driving unit 71, the third driving unit 72, the fourth driving unit 73, a second zoom position detector 71a, a third zoom position detector 72a, and the focus position detector 104.

The second zoom position detector 71a detects a position of the second group holding frame 62 on the optical axis O2, and outputs a result of the detection to the control unit 300. The second zoom position detector 71a is configured by using a photo interrupter, an encoder, or the like.

The third zoom position detector 72a detects a position of the third group holding frame 63 on the optical axis O2, and outputs a result of the detection to the control unit 300. The third zoom position detector 72a is configured by using a photo interrupter, an encoder, or the like. In the first embodiment, the second zoom position detector 71a and the third zoom position detector 72a function as a zoom position detection unit for detecting zoom positions of variable power lenses (the second lens group G2 and the third lens group G3) on the optical axis O2.

The imaging unit 44 includes at least the imaging element 441, a signal processing unit 442, and an A/D converter 443.

The imaging element 441 is configured by using a charge coupled device (CCD), a complementary metal oxide semiconductor (CMOS), or the like that receives light of a subject image condensed by the imaging optical system 50 and converts the light to an electrical signal. The imaging element 441 generates image data by receiving the light of the subject image condensed by the imaging optical system 50 and performing photoelectric conversion, and outputs the image data to the signal processing unit 442.

The signal processing unit 442 performs specified analog processing on the image data input from the imaging element 441, and outputs it to the A/D converter 443. Specifically, the signal processing unit 442 reduces reset noise or the like from the image data, performs waveform shaping, and performs gain-up to obtain desired brightness.

The A/D converter 443 performs A/D conversion on analog image data output from the signal processing unit 442 to convert it to digital image data, and outputs the digital image data to the recording unit 200 via the control unit 300.

The recording unit 200 temporarily stores therein image data input via the control unit 300, various programs to be executed by the imaging apparatus 1, and information being processed by the imaging apparatus 1. The recording unit 200 is configured by using, for example, a volatile memory, a nonvolatile memory, or the like. The recording unit 200 includes a program recording unit 201 that records therein programs to be executed by the imaging apparatus 1, and a focal-point evaluation value recording unit 202 that temporarily records therein an in-focus evaluation value at the time of AF processing by the imaging apparatus 1.

The recording medium 210 is configured by using a memory card or the like attached from the outside of the imaging apparatus 1. The recording medium 210 is detachably attached to the imaging apparatus 1 via a memory I/F (not illustrated). The recording medium 210 records therein image data subjected to image processing or image compression by the control unit 300.

The control unit 300 is configured by using a central processing unit (CPU) or the like, and comprehensively controls operations of the imaging apparatus 1 by transmitting various types of data and transmitting instruction signals to each unit of the imaging apparatus 1. The control unit 300 includes a focus sensitivity determination unit 301, a focal-point evaluation value calculation unit 302, a focal-point evaluation value determination unit 303, and a driving controller 304.

The focus sensitivity determination unit 301 determines whether FC sensitivity $\delta/\Delta Z$, which indicates a ratio of a change amount $\delta$ on an image plane of the imaging element 441 to a movement amount $\Delta Z$ of the fourth lens group G4, is equal to or smaller than a specified value based on zoom positions (focal distances) respectively detected by the second zoom position detector 71a and the third zoom position detector 72a.

The focal-point evaluation value calculation unit 302 extracts high frequency components from image data generated by the imaging element 441 in synchronization with a frame rate of the image data generated by the imaging element 441, and sequentially calculates focal point evaluation values for evaluating high and low of contrasts of subject images based on the high frequency components. Specifically, the focal-point evaluation value calculation unit 302 sequentially extracts high frequency components from pieces of image data consecutively generated by the imaging element 441 along a time series, calculates contrasts of subject images, and temporarily records them as the focal point evaluation values in the focal-point evaluation value recording unit 202.

The focal-point evaluation value determination unit 303 compares the focal point evaluation values sequentially obtained by the focal-point evaluation value calculation unit 302, and detects a focus position at which the focal point evaluation value becomes maximum.

When the focus sensitivity determination unit 301 determines that the FC sensitivity is equal to or smaller than a specified value $\alpha_1$, the driving controller 304 drives the fourth driving unit 73 and the piezoelectric elements 102 to move the fourth group holding frame 64 to the in-focus position at which the focal-point evaluation value becomes the maximum value to thereby adjust the focal point of the imaging optical system 50. On the contrary, when the focus sensitivity determination unit 301 determines that the FC sensitivity is not equal to or smaller than the specified value $\alpha_1$, the driving controller 304 is able to set the specified value $\alpha_1$ that satisfies F1max<$\alpha_1$×Z1max, where F1max is a focal point moving range from extreme close-up to infinity and Z1max is the maximum displacement amount of the movable frame 100 by the piezoelectric elements 102. In this case, by stopping and fixing the fourth driving unit 73, the holding frame 101 is maintained at a specified position, and, by driving only the piezoelectric elements 102, it becomes possible to perform control of moving the movable frame 100 to the in-focus position at which the focal point evaluation value becomes the maximum value to adjust the focal point of the imaging optical system 50.

Further, when the focus sensitivity determination unit 301 determines that the FC sensitivity is equal to or smaller than the specified value $\alpha_1$, the driving controller 304 is not able to move the focus position to the focal point moving range from extreme close-up to infinity by driving only the piezoelectric elements 102, and therefore, performs control of driving the holding frame 101 by the fourth driving unit 73 to move it to an in-focus position range in a state in which the piezoelectric elements 102 are stopped and fixed, and then performs control of stopping and fixing the fourth driving unit 73 and driving the piezoelectric elements 102 to move the movable frame 100 to the in-focus position. Even in this case, control of performing high-speed driving with a moving step of the fourth group holding frame 64 set to be large, stopping the fourth driving unit 73 when the in-focus position falls within a step range, and driving the piezoelectric elements 102 to move the movable frame 100 to the in-focus position is performed, so that high speed and precise focusing control is possible.

Figure 9:
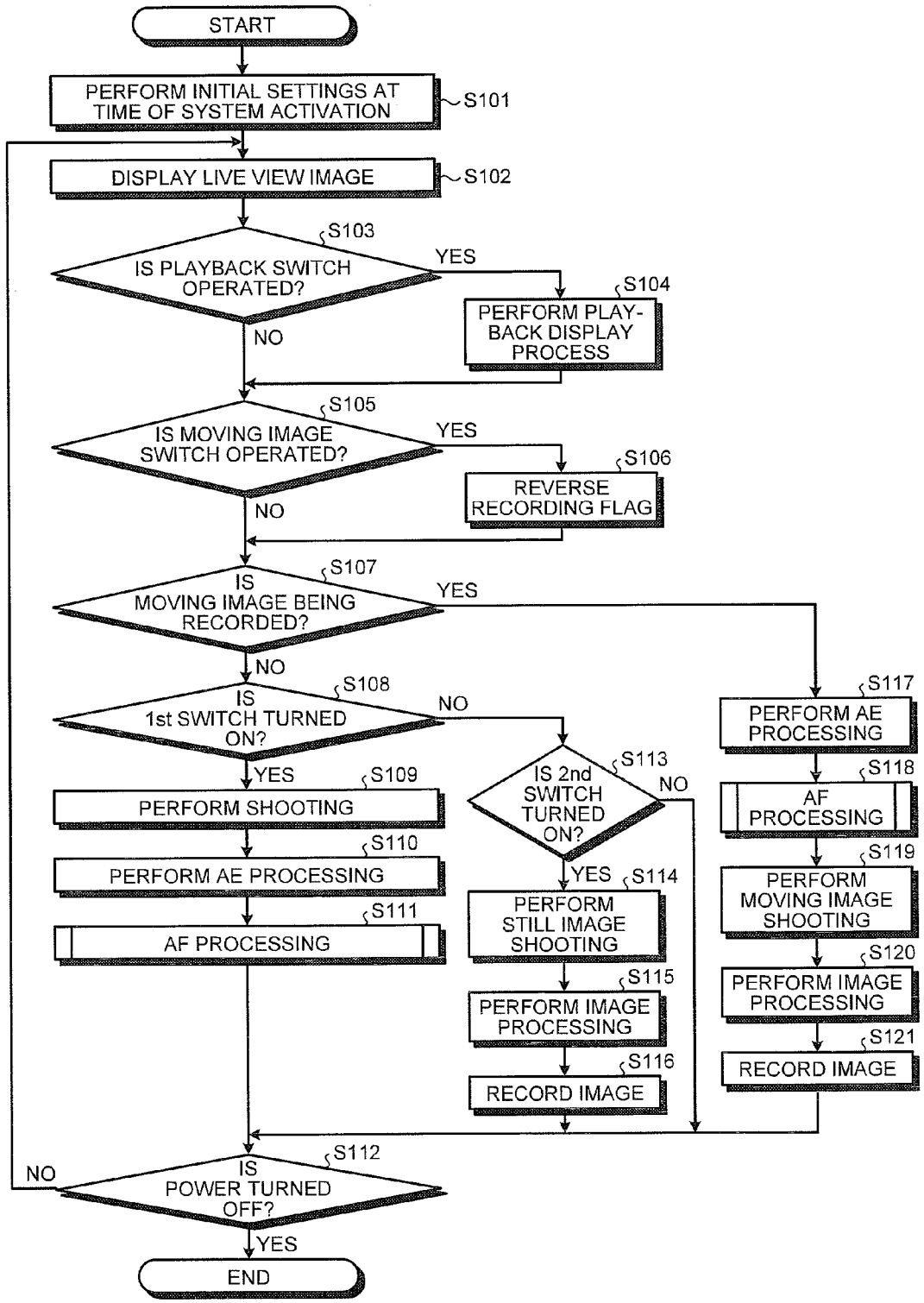
FIG. 9 is a flowchart for execution by the imaging apparatus according to the first embodiment.

Next, processes performed by the imaging apparatus 1 will be described. FIG. 9 is a flowchart illustrating an outline of a process performed by the imaging apparatus 1.

As illustrated in FIG. 9, the control unit 300, when the power switch 21c is operated and the power supply of the imaging apparatus 1 enters the ON state, performs initial settings at the time of system activation, and states of positions of switches and members of an operating unit such as the operating switch group 22a are detected (Step S101). For example, the control unit 300 performs a process of turning off a flag indicating that a moving image is being recorded, and, a zoom position of the imaging optical system is detected.

Subsequently, the control unit 300 displays, on the display unit 22c, a live view image corresponding to image data generated by the imaging element 441 (Step S102).

Thereafter, when a playback switch of the operating switch group 22a is operated (Step S103: Yes), the control unit 300 performs a playback display process of playing back and displaying, on the display unit 22c, an image corresponding to image data stored in the recording medium 210 (Step S104). After Step S104, the imaging apparatus 1 proceeds to Step S105. On the contrary, when the playback switch of the operating switch group 22a is not operated (Step S103: No), the imaging apparatus proceeds to Step S105.

Subsequently, when a moving image switch of the operating switch group 22a is operated (Step S105: Yes), the control unit 300 reverses the recording flag indicating that a moving image is being recorded (Step S106). After Step S106, the imaging apparatus 1 proceeds to Step S107. On the contrary, when the moving image switch of the operating switch group 22a is not operated (Step S105: No), the imaging apparatus 1 proceeds to Step S107.

Thereafter, the control unit 300 determines whether or not the imaging apparatus 1 is recording a moving image (Step S107). Specifically, the control unit 300, when the recording flag is on, determines that the imaging apparatus 1 is recording a moving image. When the control unit 300 determines that a moving image is being recorded (Step S107: Yes), the imaging apparatus 1 proceeds to Step S117 to be described later. On the contrary, when the control unit 300 determines that a moving image is not being recorded (Step S107: No), the imaging apparatus 1 proceeds to Step S108 to be described below.

At Step S108, when a 1st switch of the release switch 21d is turned on (Step S108: Yes), the control unit 300 causes the imaging element 441 to perform shooting (Step S109).

Subsequently, the imaging apparatus 1 performs AE processing of setting exposure conditions, such as a diaphragm value or a shutter speed, based on the image data generated by the imaging element 441 (Step S110).

Thereafter, the imaging apparatus 1 performs AF processing of driving the piezoelectric elements 102 to cause the fourth group holding frame 64, which is a focusing lens of the imaging optical system 50, to perform wobbling, moving the fourth group holding frame 64 of the imaging optical system 50 in a focusing direction while evaluating a contrast of the image data generated by the imaging element 441 and detecting a direction of an in-focus position, and driving the fourth group holding frame 64 of the imaging optical system 50 so that the contrast of the image data becomes maximum (Step S111). Details of the AF processing will be described later.

Subsequently, when the power switch 21c is operated and the imaging apparatus 1 is turned off (Step S112: Yes), the imaging apparatus 1 ends this process. When the power switch 21c is not operated and the imaging apparatus 1 is not turned off (Step S112: No), the imaging apparatus 1 returns to Step S102.

At Step S108, when the 1st switch of the release switch 21d is not operated (Step S108: No), and if a 2nd switch of the release switch 21d is turned on (Step S113: Yes), the control unit 300 causes the imaging element 441 to perform still image shooting (Step S114).

Subsequently, the control unit 300 performs image processing on the image data generated by the imaging element 441 (Step S115), and records the image data subjected to the image processing in the recording medium 210 (Step S116). After Step S116, the imaging apparatus 1 proceeds to Step S112.

At Step S117, the imaging apparatus 1 performs the AE processing of setting the exposure conditions of the imaging apparatus 1. Subsequently, the AF processing of adjusting a focus is performed (Step S118). Details of the AF processing will be described later.

Thereafter, the control unit 300 causes the imaging element 441 to perform moving image shooting (Step S119).

Subsequently, the control unit 300 performs image processing on the image data generated by the imaging element 441 (Step S120), and records the image data subjected to the image processing in the recording medium 210 (Step S121). After Step S121, the imaging apparatus 1 proceeds to Step S112.

Figure 10:
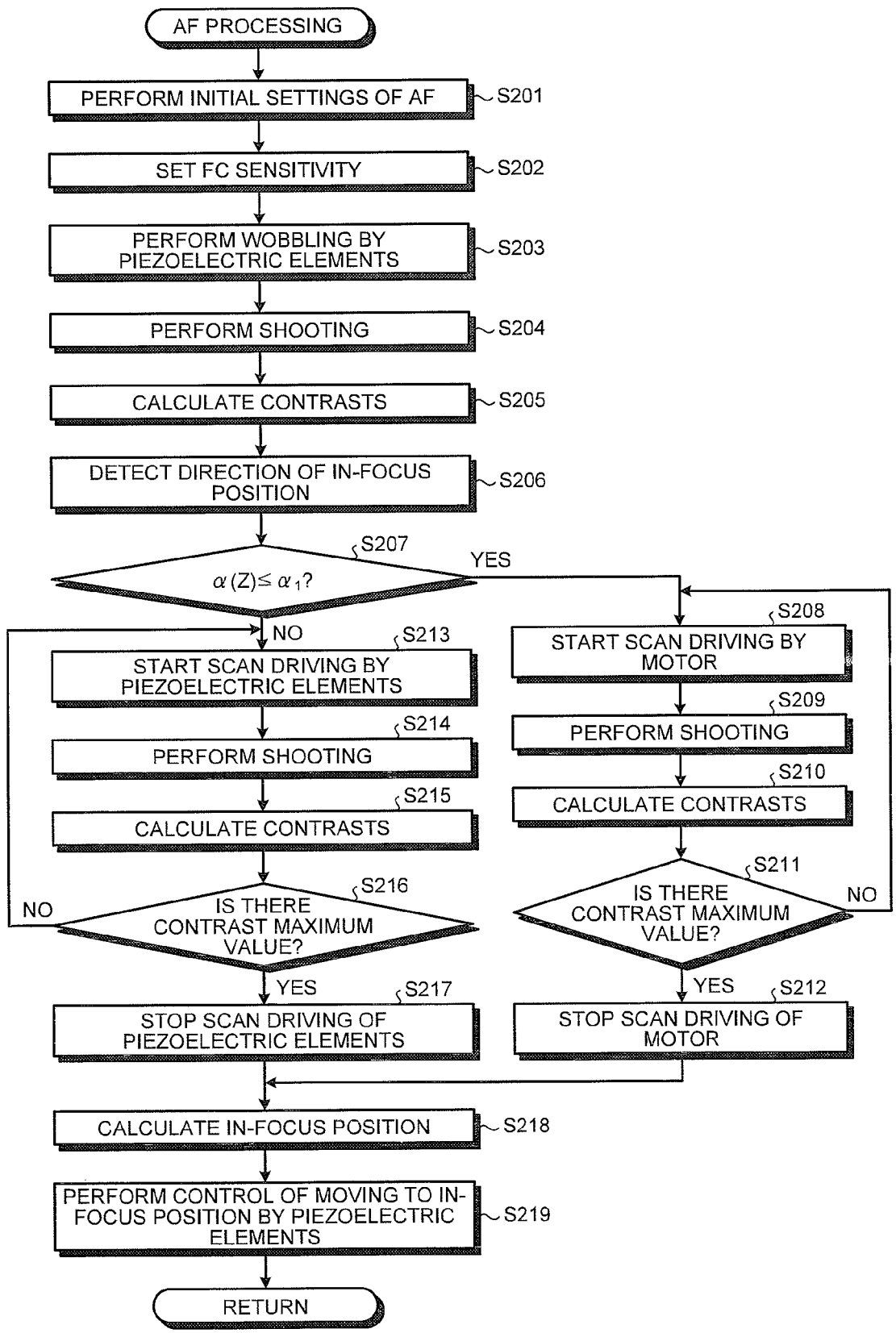
FIG. 10 is a flowchart illustrating an outline of AF processing in FIG. 9.

Next, the AF processing at Step S111 and Step S118 in FIG. 9 will be described. FIG. 10 is a flowchart illustrating an outline of the AF processing.

As illustrated in FIG. 10, the control unit 300 performs initial settings related to AF, such as a setting of an in-focus designation range on an image frame or settings of the specified value $\alpha_1$ of the FC sensitivity or a voltage value related to a frequency, an amplitude, or a waveform of wobbling in the driving controller 304 (Step S201). Herein, the wobbling is to, in order to increase a speed of the AF processing, cause the movable frame 100 to infinitesimally reciprocate along the direction of the optical axis O2 at specified amplitude and frequency. Further, the in-focus designation range indicates an area on which a person who performs shooting wants to focus, and, may be automatically set by using a face recognition technique or the like, may be selected by the person who performs shooting, or may be manually set.

Figure 11A:
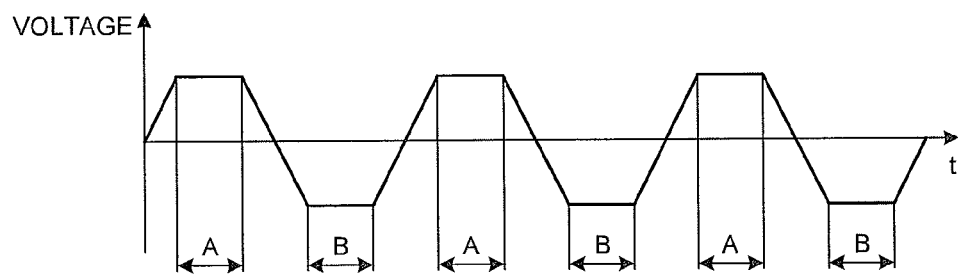
FIG. 11A is a time chart illustrating a relation between a driving signal applied to a piezoelectric element at the time of wobbling and a position of the fourth group holding frame in an optical axis direction.
Figure 11B:
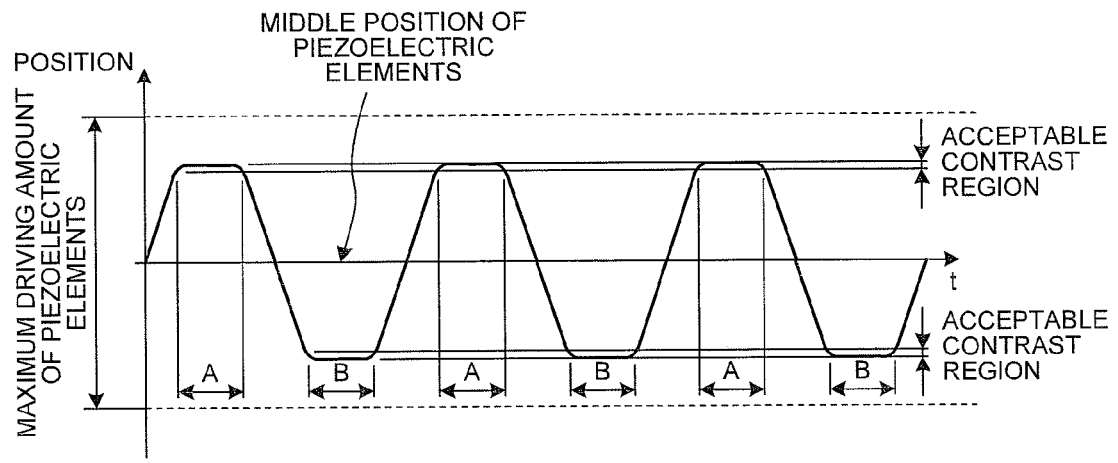
FIG. 11B is a time chart illustrating a relation between the driving signal applied to the piezoelectric element at the time of wobbling and the position of the fourth group holding frame in the optical axis direction.

FIG. 11A and FIG. 11B are time charts illustrating relations between a driving signal applied to the piezoelectric elements 102 at the time of wobbling and a position of the fourth group holding frame 64 in the direction of the optical axis O2. FIG. 11A illustrates a time chart schematically illustrating a temporal change in a driving voltage (driving signal) applied to the piezoelectric elements 102 at the time of wobbling. FIG. 11B illustrates a time chart for explaining operations of the piezoelectric elements 102 by the driving voltage applied at the time of wobbling. In FIG. 11A, the horizontal axis indicates a time and the vertical axis indicates a voltage. In FIG. 11B, the horizontal axis indicates a time and the vertical axis indicates a position of the piezoelectric elements 102. Further, in FIG. 11A and FIG. 11B, a period A and a period B indicate imaging periods of the imaging element 441.

As illustrated in FIG. 11A, the driving controller 304 sets a frequency of the driving voltage to a frequency corresponding to the frequency of the frame rate of the imaging element 441. Further, as illustrated in FIG. 11B, the driving controller 304, to obtain an adequate image contrast, drives the piezoelectric elements 102 with an oscillatory waveform that is as close to a driving waveform being a trapezoidal waveform as possible so that the fourth group holding frame 64 can wait in a range of an acceptable contrast region. As the oscillatory waveform illustrated in FIG. 11B, if the piezoelectric elements 102 are driven with the oscillatory waveform being a trapezoidal waveform, a time in which the fourth group holding frame 64 waits in the acceptable contrast region increases, but unnecessary oscillation may occur in the movable frame 100 in a rising or falling period, or overshoot (excess) of operations may occur. Further, as long as an image with an acceptable contrast can be obtained, the driving waveform may of course be a sinusoidal waveform or a triangular waveform, or a waveform approximated by these waveforms.

After Step S201, by using zoom position information set at Step S201, an FC sensitivity α(z) is read out from a table of FC sensitivities with respect to a pre-stored zoom position Z, and is set in a specified area of the recording unit 200 (Step S202). The driving controller 304 drives the piezoelectric elements 102 to cause the fourth group holding frame 64 to perform wobbling along the optical axis O2 (Step S203), and causes the imaging element 441 to perform shooting (Step S204).

Thereafter, the focal-point evaluation value calculation unit 302 calculates contrasts of the in-focus designation range of the image data generated by the imaging element 441 (Step S205). Contrast values calculated here serve as the focal point evaluation values.

Subsequently, the focal-point evaluation value determination unit 303, from the contrast values at different focus positions calculated at Step S205, detects a direction of the in-focus position to which the fourth group holding frame 64 is to be moved along the optical axis O2 (Step S206).

Figure 12:
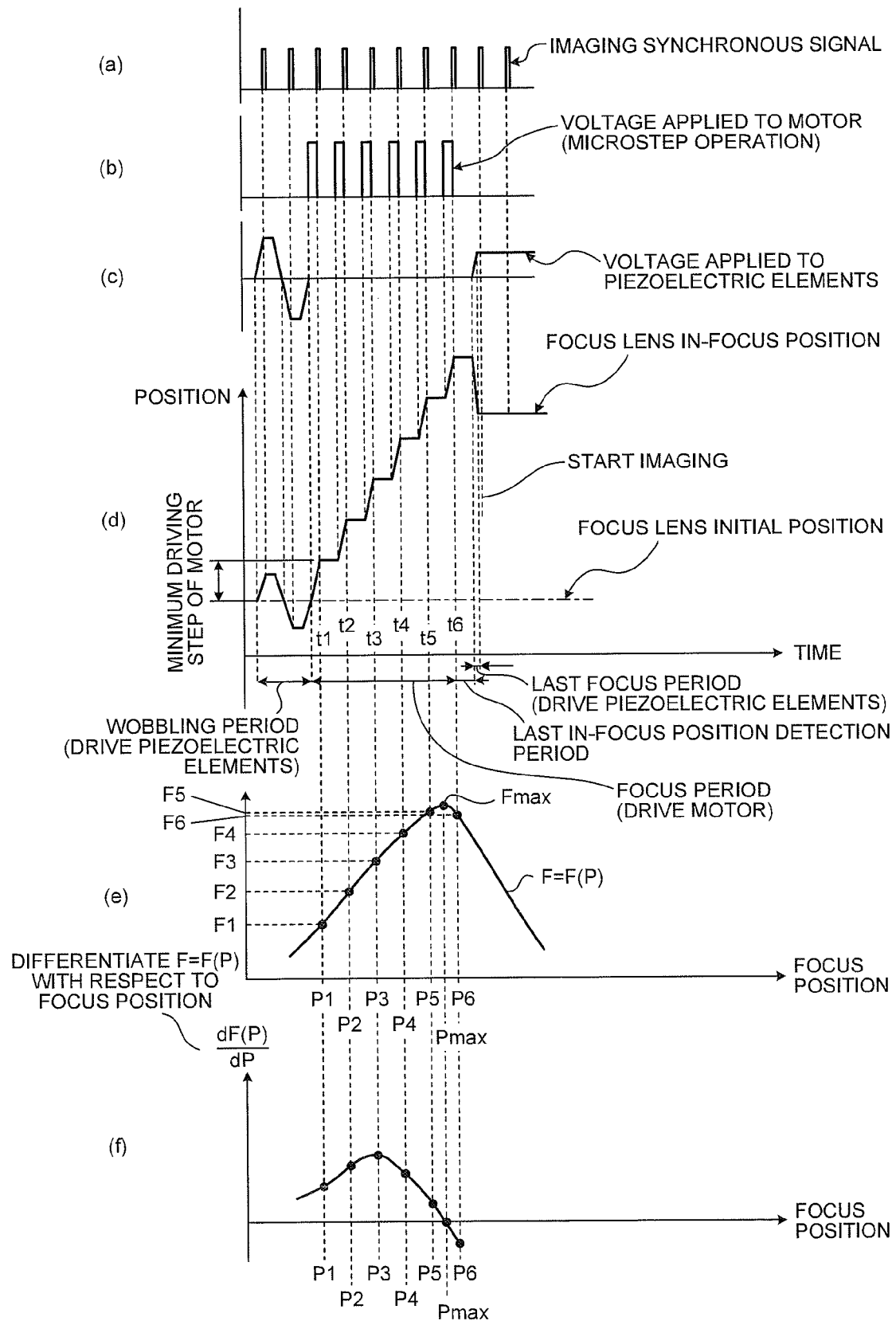
FIG. 12 is a time chart illustrating relations among an imaging timing of an imaging element, an operation timing of the fourth driving unit, an operation timing of the piezoelectric element, and a focal point evaluation value.

FIG. 12 is a time chart illustrating relations among an imaging timing of the imaging element 441, an operation timing of the fourth driving unit 73 (motor), an operation timing of the piezoelectric elements 102, and the focal point evaluation value (contrast). An (a) of FIG. 12 indicates a timing of a synchronous signal when the imaging element 441 captures images, (b) of FIG. 12 illustrates a timing of a voltage applied to the fourth driving unit 73, (c) of FIG. 12 illustrates a timing of a voltage applied to the piezoelectric elements 102, (d) of FIG. 12 illustrates a time chart indicating a position of the fourth group holding frame 64 on the optical axis O2, (e) of FIG. 12 illustrates a time chart indicating a relation between the focus position of the fourth group holding frame 64 and a contrast, and (f) of FIG. 12 illustrates a time chart of an in-focus evaluation value obtained when a temporal change in the contrast (F=F(P)) is differentiated with respect to a focus position (dP). In (a) to (f) of FIG. 12, the horizontal axis indicates a time. Further, in (a) to (c) of FIG. 12, the vertical axis indicates a voltage. Furthermore, in (d) of FIG. 12, the vertical axis indicates the position of the fourth group holding frame 64 on the optical axis O2. Moreover, in (e) of FIG. 12, the horizontal axis indicates the focus position of the fourth group holding frame 64, and the vertical axis indicates the contrast. Furthermore, in (f) of FIG. 12, the vertical axis indicates the in-focus evaluation value obtained when the temporal change in the contrast (F=F(P)) is differentiated with respect to the focus position (dP), and the horizontal axis indicates the focus position.

As illustrated in FIG. 12, the driving controller 304 alternately performs front position imaging of causing the imaging element 441 to perform imaging while driving the piezoelectric elements 102 to cause the movable frame 100 to perform wobbling so that the movable frame 100 is located in a front position, and rear position imaging of causing the imaging element 441 to perform imaging while the movable frame 100 is located in a rear position. Thereafter, the focal-point evaluation value determination unit 303 compares contrasts of two images corresponding to two respective pieces of image data generated by the imaging element 441 through the front position imaging and the rear position imaging, and determines a driving direction of the fourth group holding frame 64 in which the contrast is higher as the direction in which the in-focus position is located.

Referring back to FIG. 10, explanation of Step S207 and later will be continued. At Step S207, the focus sensitivity determination unit 301 compares the focus sensitivity α(Z) corresponding to the zoom position Z set at Step S202 with the specified value $α_1$ of the focus sensitivity set at the AF initial setting at Step S201 (Step S207). If α(Z)≥$α_1$ (Step S207: Yes), the driving controller 304 starts scan driving for detecting a peak of the contrast by causing the fourth driving unit 73 (motor) to drive in order to move the fourth group holding frame 64 along the optical axis O2 toward the in-focus position. Specifically, as illustrated in (d) of FIG. 12, the driving controller 304 causes the fourth driving unit 73, by microstep operations, to move the fourth group holding frame 64 along the optical axis O2 in a step-by-step manner (Step S208).

Thereafter, the control unit 300 causes the imaging element 441 to perform shooting (Step S209), and causes the focal-point evaluation value calculation unit 302 to calculate contrasts in an AF designation range of the captured images (Step S210) to determine whether there is a focal point evaluation value that exceeds a maximum value (Step S211). Specifically, inclinations of contrast values with respect to a plurality of consecutively-acquired focus positions are sequentially calculated, and whether a focus position with the inclination of zero has been passed is determined. As the easiest method, it is sufficient to calculate an inclination value from two consecutively-acquired contrast values and detect that an inclination value becomes a negative value from positive.

Thereafter, when the focal-point evaluation value determination unit 303 determines that there is a focal point evaluation value that exceeds the maximum value (Step S211: Yes), the imaging apparatus 1 proceeds to Step S212 to be described later. On the contrary, when the focal-point evaluation value determination unit 303 determines that there is no focal point evaluation value that exceeds the maximum value (Step S211: No), the imaging apparatus 1 returns to Step S208.

At Step S212, the driving controller 304 stops the fourth driving unit 73 to stop the scan driving of the fourth group holding frame 64 along the optical axis O2. Specifically, as illustrated in (d) of FIG. 12 and (e) of FIG. 12, the driving controller 304, at a time t6 of a focus position P6 beyond a maximum value $F_{max}$ of the in-focus evaluation value, stops the scan driving of moving the fourth group holding frame 64 to the in-focus position along the optical axis O2 by synchronizing the fourth driving unit 73 (motor) with a synchronous signal of the imaging element 441 (Step S212).

Subsequently, the focal-point evaluation value calculation unit 302, based on the focal point evaluation values (contrasts) of sequentially-acquired images, calculates an in-focus position on the optical axis O2 (Step S213). Specifically, by calculating a focus position with the inclination of zero by using calculations of contrast values and inclinations with respect to the focus positions that are used for determining that there is a focal point evaluation value that exceeds a contrast maximum value by the focal-point evaluation value determination unit 303, the in-focus position is calculated. For example, as illustrated in (e) of FIG. 12, the focal-point evaluation value calculation unit 302, based on focus positions P4, P5, and P6 and focal point evaluation values F4, F5, and F6, calculates an inclination at a middle position between the focus positions P4 and P5 from two points that are the focus positions P4 and P5, to thereby calculate an in-focus position $P_{max}$ at which the inclination is zero (Step S218). Then, the driving controller 304 drives the piezoelectric elements 102, performs control of moving the fourth group holding frame 64 to the in-focus position $P_{max}$ (Step S219), and ends a series of AF operations. Specifically, as illustrated in FIG. 12(d), the driving controller 304 drives the piezoelectric elements 102 to reverse the movable frame 100 toward the in-focus position $P_{max}$. Therefore, the fourth lens group G4 is able to come close to extreme close-up with a small movement amount, so that it is possible to perform focusing at high speed and with high accuracy. As a result, it becomes possible to capture an image focusing on a subject without missing a best shot of the subject. After Step S219, the imaging apparatus 1 returns to the main routine in FIG. 9.

In contrast, at Step S207, by comparison of the focus sensitivity $\alpha(Z)$ corresponding to the zoom position Z with the specified value $\alpha_1$, if $\alpha(Z) > \alpha_1$ (Step S207: No), scan driving of driving the piezoelectric elements 102 in the direction toward the in-focus position to move the fourth group holding frame 64 is performed (Step S213). Operations from Step S214 to Step S217 are the same as the operations from Step S209 to Step S212, so they are omitted herein. Further, when Step S217 ends, shift to operations starting from already-described Step S218 is performed.

Figures 13, 14:
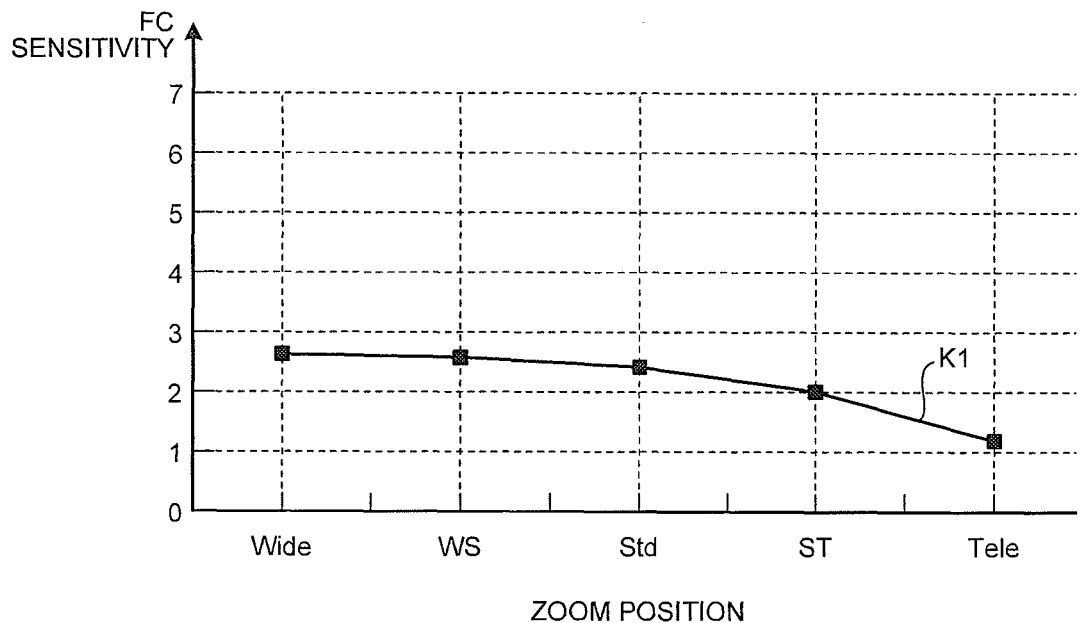
FIG. 13 is a diagram illustrating a relation between a zoom position and a focus sensitivity of a fourth lens group in the imaging optical system.
FIG. 14 is a diagram illustrating a relation between the focus sensitivity and an extension amount from infinity to extreme close-up of the fourth lens group.

FIG. 13 is a diagram illustrating a relation between the zoom position and the focus sensitivity (described as an FC sensitivity) of the fourth lens group G4 in the imaging optical system 50. FIG. 14 is a diagram illustrating a relation between the FC sensitivity and an extension amount from infinity to extreme close-up of the fourth lens group G4 (a focusing movement amount). In FIG. 13, the horizontal axis indicates the zoom position that is a focal distance from Wide to Tele of the imaging optical system 50, and the vertical axis indicates the focus sensitivity. The zoom position is information set from a position detection unit that detects a position of a single lens group among a plurality of lens groups that are displaced by zooming and from focal distance information corresponding to detection results by the position detection unit, and, as described earlier, is set in the recording unit 200 at the time of the initial settings of the AF processing. Further, a curved line K1 indicates a relation between the zoom position and the FC sensitivity of the imaging optical system 50. In FIG. 14, the FC sensitivities of the fourth lens group G4 at focal distances which are quarters of the focal distance from Wide to Tele of the imaging optical system 50 and the extension amounts from infinity to extreme close-up of a subject distance of the fourth lens group G4 at respective focal distances are illustrated.

As illustrated in the curved line K1 in FIG. 13 and an FC sensitivity table T1 in FIG. 14, by taking a reference position (Std) of the zoom position of the imaging optical system 50 as a boundary, the inclination of the FC sensitivity greatly changes and the extension amount of the fourth lens group G4 changes. Specifically, when the zoom position of the imaging optical system 50 is equal to or smaller than a reference position (Wide to Std), the FC sensitivity increases, and the degree of accuracy of focusing is reduced if the fourth lens group G4 is not moved by minuter steps. Further, the extension amount of the fourth lens group G4 is also reduced.

On the contrary, when the zoom position of the imaging optical system 50 reaches beyond the reference position (Std to Tele), the FC sensitivity decreases, the movement amount of the fourth lens group G4 to move the focal point increases, and a longer time is taken. Further, the extension amount of the fourth lens group G4 also increases. Therefore, in the first embodiment, the driving controller 304, when the FC sensitivity of the imaging optical system 50 exceeds 2.405, that is, when the zoom position is on the Wide side relative to the reference position (Wide to Std), drives the piezoelectric elements 102 to move the movable frame 100 to the in-focus position to perform focusing at high speed and with high accuracy, and, when the FC sensitivity of the imaging optical system 50 is equal to or smaller than 2.405, that is, when the zoom position is located on the Tele side from the reference position (Std to Tele), performs high-speed focusing of driving the fourth driving unit 73 (motor) to move the fourth group holding frame 64 in the direction toward the in-focus position, and after confirming that the in-focus position is located in a predetermine range, performs a high-speed high-accuracy focusing operation by driving the piezoelectric elements 102.

According to the above described first embodiment, the driving controller 304, when the focus sensitivity determination unit 301 determines that the FC sensitivity indicating a ratio of a change amount of an in-focus position to a movement amount of the fourth lens group G4 is equal to or smaller than a specified value, performs control of driving the fourth driving unit 73 and the piezoelectric elements 102 to move the fourth lens group G4 to the in-focus position, and, when it is determined that the FC sensitivity is not equal to or smaller than the specified value, performs control of driving only the piezoelectric elements 102 to move the fourth lens group G4 to the in-focus position; therefore, it is possible to perform AF processing at high speed and with high accuracy.

Further, according to the first embodiment, the driving controller 304, when the focal-point evaluation value determination unit 303 determines that the maximum value has been passed by, drives the piezoelectric elements 102 to move the movable frame 100 to the in-focus position; therefore, it is possible to perform AF processing at higher speed and with higher accuracy at the time of the AF processing.

Figure 15A:
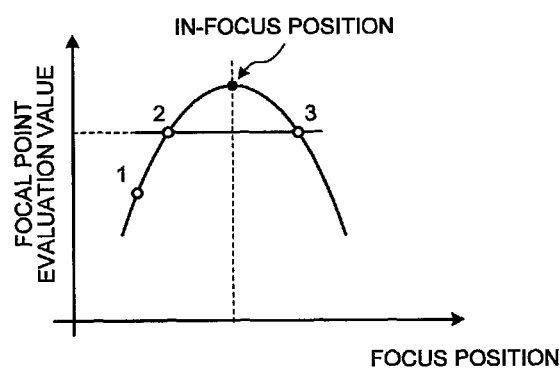
FIG. 15A is a diagram illustrating a relation between a focus position and the focal point evaluation value.
Figure 15B:
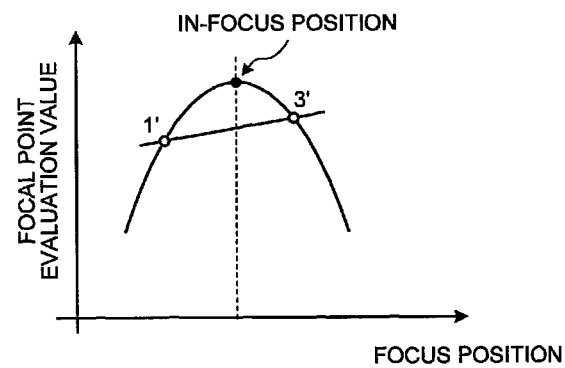
FIG. 15B is a diagram illustrating a relation between a derivative value and the focus position of each point with respect to FIG. 15A.

Furthermore, in the first embodiment, with respect to the imaging optical system 50 with a relation between the focus position and the contrast as illustrated in reference diagrams of FIG. 15A and FIG. 15B, the scan driving is performed on the fourth lens group G4 as in the diagrams, and, even when contrasts are acquired at points (a point 1 to a point 3) illustrated in the diagrams, inclinations, that is, derivative values, are calculated from sequentially-acquired contrast values and focus positions, and a point at which the derivative value changes from positive to negative, that is, a point at which the derivative value is zero, can be found. Moreover, the position at which the derivative value is zero indicates the in-focus position. Furthermore, in the case in FIG. 15B, to obtain the point at which the derivative value is zero, it is necessary to acquire images at two or more positions beyond the focus position with the maximum contrast, and an operation amount of the piezoelectric elements 102 needed in this case is equal to or twice or more of a minimum operation amount of the fourth driving unit. Therefore, it is preferable to set a maximum displacement amount of the piezoelectric elements 102 to be twice or more of a minimum movement amount of the fourth driving unit 73.

Second Embodiment

Next, a second embodiment will be described. In an imaging apparatus according to the second embodiment, the fourth group holding mechanism that holds and drives the above described fourth lens group has a different configuration. Therefore, in the following, a configuration of a fourth group holding mechanism according to the second embodiment will be described. The same configurations as those of the imaging apparatus 1 according to the above described first embodiment are denoted by the same reference signs, and explanation thereof will be omitted.

Figure 16:
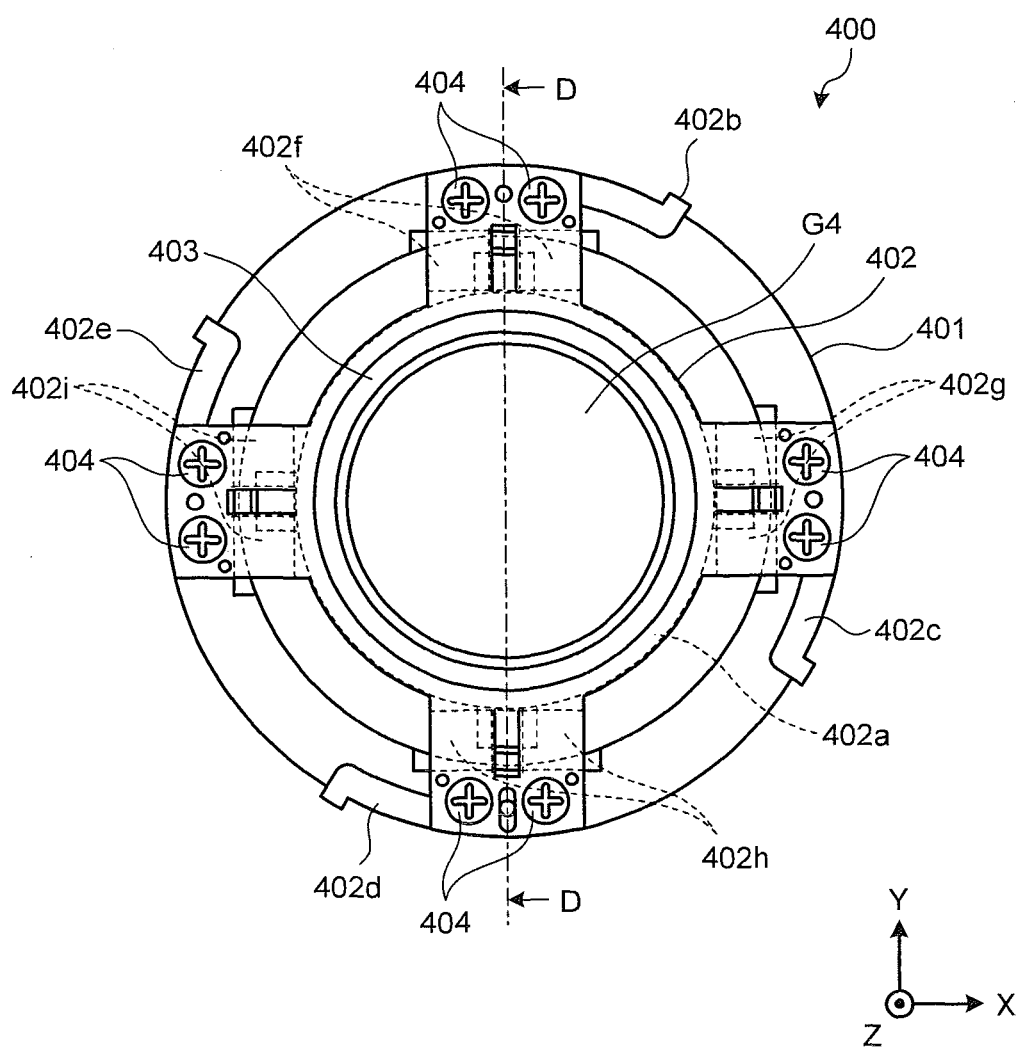
FIG. 16 is a front view illustrating an outline of main parts of a fourth group holding mechanism of an imaging apparatus according to a second embodiment, viewed from a subject side.
Figure 17:
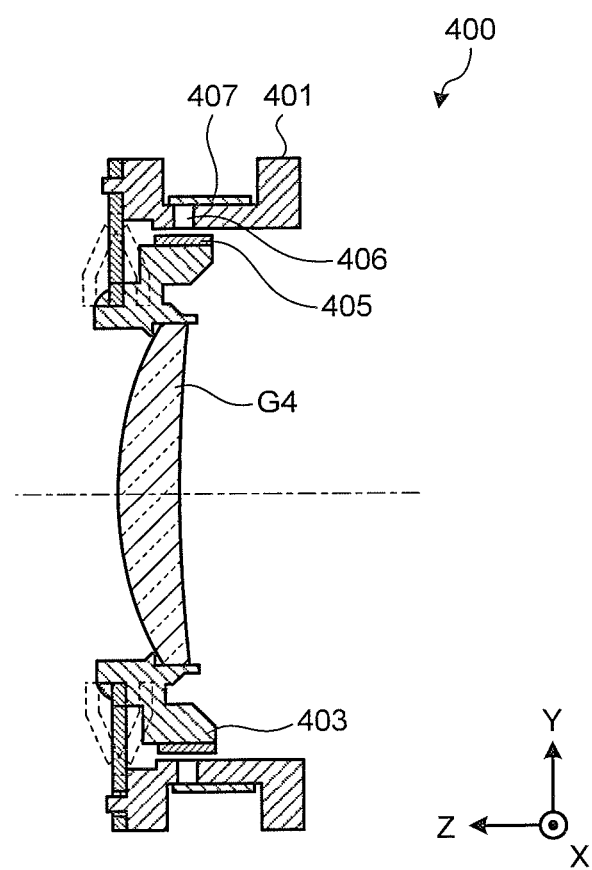
FIG. 17 is a D-D line cross section in FIG. 16.

FIG. 16 is a front view illustrating an outline of main parts of the fourth group holding mechanism of the imaging apparatus 1 according to the second embodiment, viewed from a subject side. FIG. 17 is a D-D line cross section in FIG. 16.

As illustrated in FIG. 16 and FIG. 17, a fourth group holding mechanism 400 includes a fixing frame 401, a plate-shaped piezoelectric sheet 402, and a movable frame 403.

The piezoelectric sheet 402 includes a ring-shaped part 402a having an approximately circular ring shape and includes an arm part 402b, an arm part 402c, an arm part 402d, and an arm part 402e, which radially extend from the ring-shaped part 402a.

In the ring-shaped part 402a, an electrode to which a voltage is applied is not formed. Further, the ring-shaped part 402a is attached and fixed to the movable frame 403, so that the flatness along an attachment surface in the movable frame 403 is ensured.

The arm parts 402b to 402e are fixed to the fixing frame 401 with screws 404. The arm parts 402b to 402e are arranged at equal intervals in equally divided four positions on the circumference of the ring-shaped part 402a. The arm part 402b to the arm part 402e, by being fixed to the fixing frame 401 at one ends thereof, ensure the flatness of the piezoelectric sheet 402. On each of the arm part 402b to the arm part 402e, piezoelectric body parts 402f, piezoelectric body parts 402g, piezoelectric body parts 402h, or piezoelectric body parts 402i, all of which have rectangular shapes and perform bending operations when voltages are applied, are formed. In the piezoelectric body parts 402f, the piezoelectric body parts 402g, the piezoelectric body parts 402h, and the piezoelectric body parts 402i, rectangular electrodes for voltage application are formed across the piezoelectric body parts.

The piezoelectric body parts 402f to the piezoelectric body parts 402i are formed at two portions respectively on the arm part 402b to the arm part 402e. Specifically, on the arm part 402b, the two piezoelectric body parts 402f are formed. Each of the piezoelectric body parts 402f to the piezoelectric body parts 402i has a square of 5 mm with a thickness of about 0.8 mm, and is able to perform driving at 120 Hz with the maximum displacement of 120 μm with respect to the fourth lens group G4. In the second embodiment, the two piezoelectric body parts 402f to the piezoelectric body parts 402i are respectively formed on the arm part 402b to the arm part 402e; however, the number of the piezoelectric body parts 402f to the piezoelectric body parts 402i to be formed may be one or three or more. Further, it is sufficient that the number of the arm part is one or more. Furthermore, the shapes of the piezoelectric body parts 402f to the piezoelectric body parts 402i are not limited to rectangular plate shapes, and may be elliptical plate shapes, arc plate shapes, or the like.

The movable frame 403 is fixed to the ring-shaped part 402a of the piezoelectric sheet 402 with, for example, an adhesive material or the like, and holds the fourth lens group G4 in an inner circumferential portion. In FIG. 17, to simplify the configuration of the fourth lens group G4, it is expressed by a single lens. Further, on an outer circumferential portion of the movable frame 403, a scale 405 formed of, for example, a magnet is provided.

To the fixing frame 401, the arm parts 402b to 402e of the piezoelectric sheet 402 are fixed with the screws 404. For example, by insertion of protrusions (not illustrated) provided on a surface opposite to the piezoelectric sheet 402 into holes (not illustrated) provided on the arm parts 402b to 402e, the piezoelectric sheet 402 is positioned and fixed to the fixing frame 401. Fixation between the fixing frame 401 and the piezoelectric sheet 402 may be made by, for example, swaging or welding other than bonding or screwing.

Further, on the fixing frame 401, a focus position detector 406 formed of a hall element that detects magnetism is provided so as to face the scale 405 that is a magnet magnetized in a direction perpendicular to an optical axis. In the second embodiment, four sets of the scale 405 and the focus position detector 406 are provided; however, one set is possible, or it may be possible to perform open-loop control without providing the scale 405 and the focus position detector 406 at all. According to the second embodiment, the scale 405 and the focus position detector 406 are provided near each of the arm part 402b to the arm part 402e that are maximum displacement portions of the piezoelectric sheet 402; therefore, it is possible to more precisely detect a position of the fourth lens group G4.

By configuring the piezoelectric body parts 402f to the piezoelectric body parts 402i such that the respective sets drive independently of each other, it becomes possible to perform correction with the inclusion of an inclination of the fourth lens group G4 with respect to the optical axis O2, and to perform wobbling or focus driving with extremely high accuracy.

Further, circuit lines for applying signal voltages to the piezoelectric body parts 402f to the piezoelectric body parts 402i of the piezoelectric sheet 402 extend to terminal parts extending from end portions of the arm parts 402b to 402e, and are electrically connected to flexible members 407 formed of flexible printed boards. Furthermore, the focus position detectors 406 are also connected to electrical circuits by the flexible members 407 in the same manner.

Moreover, even when the fourth lens group G4 is not caused to perform wobbling or focus driving, by applying different voltages respectively to the piezoelectric body parts 402f to the piezoelectric body parts 402i, it is possible to correct an inclination of the optical axis O2 or lens intervals between the fourth lens group G4 and the first lens group G1 and between the second lens group G2 and the fifth lens group G5 with extremely high accuracy. Furthermore, when wobbling or focus driving is to be performed, by performing control of adding, as an offset value, a correction voltage, which gives corrected displacement, to a diving signal of the wobbling or a driving signal of the focus driving, it is possible to simplify the control.

According to the above described second embodiment, it is possible to drive the movable frame 403 holding the fourth lens group G4 at high speed and with high accuracy.

Further, according to the second embodiment, it is possible to easily correct an inclination of the movable frame 403, to correct optical performance of the imaging optical system 50 by displacement of the inclination of the movable frame 403, and to perform driving with high accuracy.

Other Embodiments

In the embodiments, apart from the folded optical system, application to a straight optical system is possible. In this case, while a prism is arranged as a reflecting surface among lenses of the above described folded optical system, by removing the prism to reduce optical path lengths among the lenses by taking into account the optical path lengths, application to the straight optical system is possible.

Further, the imaging apparatus according to the embodiments is applicable to, apart from a lens-integrated digital camera, a digital camera to which a lens is detachably attachable, a digital video camera, or an electronic device such as a mobile phone or a tablet portable terminal having an imaging function.

Furthermore, programs to be executed by the imaging apparatus according to the embodiments may be provided by being recorded in a computer-readable recording medium such as a CD-ROM, a flexible disk (FD), a CD-R, a digital versatile disk (DVD9, a USB medium, or a flash memory, as file data in an installable format or an executable format.

Moreover, the programs to be executed by the imaging apparatus according to the embodiments may be downloaded via a network and recorded in a flash memory, a recording medium, or the like. Furthermore, the programs to be executed by the imaging apparatus according to the embodiments may be provided or distributed via a network, such as the Internet.

In describing the flowcharts in this specification, context of the processes among the steps is disclosed by using expressions such as "first", "thereafter", and "subsequently", but the sequences of the processes necessary for carrying out the present invention are not uniquely defined by these expressions. In other words, the sequences of the processes in the flowcharts described in the present specification may be modified as long as there is no contradiction.

Accordingly, the present invention may include various embodiments not described herein, and various design changes or the like within the scope of the technical ideas specified by the scope of the claims may be made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging optical system that has a variable power lens capable of changing a focal distance by moving along an optical axis direction, has a focus lens capable of adjusting a focal point by moving along the optical axis direction, and forms a subject image by the variable power lens and the focus lens;
   an imaging element that generates image data via the imaging optical system;
   a movable frame that holds the focus lens and is movable back and forth along an optical axis of the imaging optical system;
   a holding frame that holds the movable frame movably along the optical axis;
   a first movement driver that is disposed between the movable frame and the holding frame and causes the movable frame to move along the optical axis direction to adjust the focal point of the imaging optical system;
   a second movement driver that is driven with a minimum movement amount larger than a minimum movement amount of the first movement driver and causes the holding frame to move along the optical axis direction to adjust the focal point of the imaging optical system;
   a zoom position detector that detects a zoom position of the variable power lens on the optical axis;
   a focus sensitivity determination processor that, based on the zoom position detected by the zoom position detector, determines whether a focus sensitivity indicating a ratio of a change amount of the in-focus position to a movement amount of the focus lens is equal to or smaller than a specified value; and
   a driving controller that drives the first movement driver to move the movable frame to the in-focus position if the focus sensitivity determination processor determines that the focus sensitivity is larger than the specified value, and drives the first and second movement drivers to move the movable frame to the in-focus position if the focus sensitivity determination processor determines that the focus sensitivity is equal to or smaller than the specified value.

2. The imaging apparatus according to claim 1, further comprising:
   a focal-point evaluation value calculation processor that extracts high frequency components from the image data in synchronization with a frame rate of the image data generated by the imaging element, and sequentially calculates focal point evaluation values for evaluating high and low of contrast of the subject image based on the high frequency components; and
   a focal-point evaluation value determination processor that, when the movable frame sequentially moves along the optical axis direction, determines a maximum value corresponding to the in-focus position from the focal point evaluation values sequentially calculated by the focal-point evaluation value calculation processor, wherein
   if the focus sensitivity determination processor determines that the focus sensitivity is larger than the specified value and the focal-point evaluation value determination processor determines the maximum value, the driving controller drives only the first driving movement driver to move the movable frame to the in-focus position corresponding to the maximum value.

3. The imaging apparatus according to claim 1, wherein the first movement driver is a voltage-displacement actuator that causes displacement when voltage is applied.

4. The imaging apparatus according to claim 3, wherein the actuator is one of an organic piezoelectric element, an inorganic piezoelectric element, an organic-inorganic hybrid piezoelectric element, an ion-conducting actuator, and a conductive polymer actuator.

5. The imaging apparatus according to claim 1, wherein the second movement driver is a motor capable of moving the movable frame in an entire range of motion in the optical axis direction.

6. The imaging apparatus according to claim 5, wherein the motor is one of a DC motor, a stepping motor, an ultrasonic motor, and an electrostatic motor.

* * * * *